United States Patent [19]

Taylor

[11] Patent Number: 5,469,572
[45] Date of Patent: Nov. 21, 1995

[54] POST COMPILE OPTIMIZER FOR LINKABLE OBJECT CODE

[76] Inventor: James M. Taylor, 4535 Harvest Hill, Dallas, Tex. 75244

[21] Appl. No.: 984,082

[22] Filed: Dec. 1, 1992

[51] Int. Cl.$^6$ .................................................. G06F 9/45
[52] U.S. Cl. ...................... 395/700; 364/280.5; 364/16.1
[58] Field of Search ........................ 395/700; 364/280.5, 364/973

[56] References Cited

U.S. PATENT DOCUMENTS

| | | | |
|---|---|---|---|
| 4,571,678 | 2/1986 | Chaitin | 395/700 |
| 4,642,764 | 2/1987 | Auslander et al. | 395/700 |
| 4,656,582 | 4/1987 | Chaitin et al. | 395/700 |
| 4,656,583 | 4/1987 | Auslander et al. | 395/700 |
| 4,667,290 | 5/1987 | Goss et al. | 364/300 |
| 4,672,532 | 6/1987 | JongeVos | 364/200 |
| 4,782,444 | 11/1988 | Munshi et al. | 395/700 |
| 4,791,558 | 12/1988 | Chaitin et al. | 364/200 |
| 5,051,893 | 9/1991 | Tenny et al. | 364/200 |
| 5,230,050 | 7/1993 | Iisuka et al. | 395/700 |

*Primary Examiner*—Kevin A. Kriess
*Assistant Examiner*—Dennis M. Butler
*Attorney, Agent, or Firm*—David W. Carstens; Harris, Tucker & Hardin

[57] ABSTRACT

A system for processing a complete object code data set, to be linked into an executable program. The system features means for facilitating optimization analysis based upon the complete object code data set and also means for modifying the object code data based upon the optimization analysis results. The system allows for the specification of static instruction ranges that are to be isolated from the optimization process. Indirect and external process transfer of control destination ranges are identified in order to formulate the proper control flow information necessary to retain the optimized object code data integrity. The system enables the implementation of a class of optimizations which are supplemental to the standard class of optimizations performed during the initial object code generation process.

26 Claims, 30 Drawing Sheets

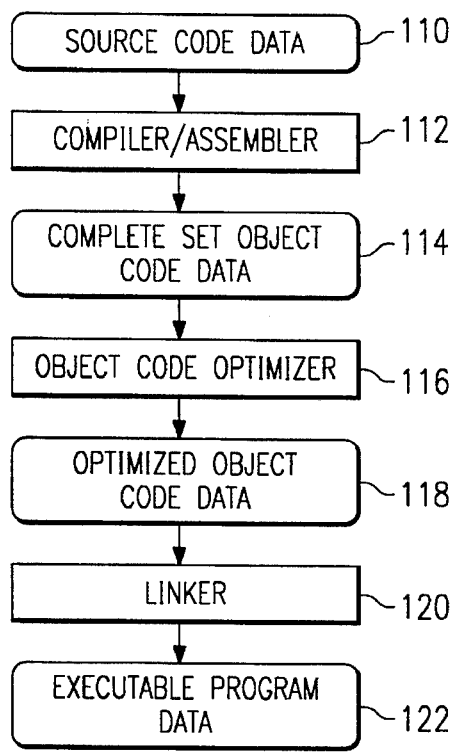
FIG. 1
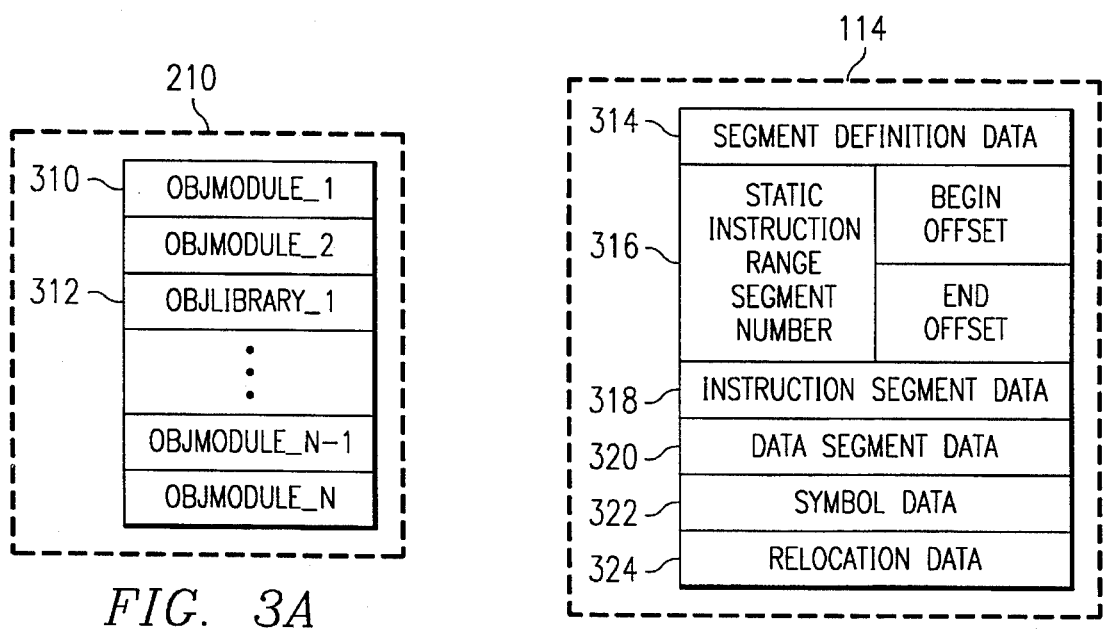
FIG. 3A
FIG. 3B

FIG. 18

```
                SEG1_TEXT segment byte public 'CODE'
0000            _seg1_proc1 proc far
0000    CB      ret
                _seg1_proc1 endp 0001            _seg1_proc2 proc far
0001    CB      ret
                _seg1_proc2 endp
                SEG1_TEXT ends SEG2_TEXT segment byte public 'CODE'
0000            _seg2_proc proc far
0000    55      push  bp
0001    B8 0000r    mov   ax,offset_seg1_proc1
0004    B8 0001r    mov   ax,offset_seg1_proc2
0007    B8 0000r    mov   ax,offset_seg2_proc
000A    5D      pop   bp
000B    CB      ret
                _seg2_proc endp
                SEG2_TEXT ends
```

FIG. 19 struct call_list

{ called_list    \*next_call;

called_list    \*previous_call;

unsigned int    call_flag;

unsigned int    offset;

CALL_LIST    \*CALLED_PROCPTR

```
jng    a:              jg    b:
                       jmp   a:
                       b:
```

FIG. 21

```
struct instruction_list
{
    instruction_list    *next_instruction;
    instruction_list    *previous_instruction;
    unsigned char       instruction_size;
    unsigned char       flag;
    unsigned char       opcodes[5];
    unsigned int        displacement;
};
```

FIG. 22

```
struct edit_list
{
    edit_list       *next_edit;
    edit_list       *previous_edit;
    unsigned int    old_offset;
    unsigned int    edited_offset;
    signed char     delta;
};
```

FIG. 23

```
calculate_edited_offset(edit_list *first_edit_ptr)
{
    edit_list     *edit_ptr;
    unsigned int  delta_total;

delta_total = 0;

for (edit_ptr = first_edit_ptr ; edit_ptr != NULL;
         edit_ptr = edit_ptr->next_edit)
    {
        delta_total += edit_ptr->delta;
        edit_ptr->edited_offset = edit_ptr->old_offset + delta_total;
    }
}
```

FIG. 24

```
struct procedure_range
{
    procedure_range   *next_procedure;
    procedure_range   *previous_procedure;
    instruction_list  *instruction_ptr
    unsigned int      procedure_flag;
    unsigned int      procedure_size;
    segment_list      *new_segment_ptr;
};
```

FIG. 25

```
procedure_range    *first_procedure_ptr;
edit_list          *first_edit_ptr;

adjust_instruction_displacement8()
{
    unsigned long      destination_offset,
                       edited_destination_offset;
    unsigned int       instruction_offset;
    procedure_range    *procedure_ptr;
    instruction_list   *instruction_ptr;
    edit_list          *edit_ptr,
                       *previous_edit_ptr,
                       *next_edit_ptr;

next_edit_ptr = first_edit_ptr;
    previous_edit_ptr = NULL;
    instruction_offset = 0;
    /* loop through all procedure ranges in an instruction segment */
    for (procedure_ptr = first_procedure_ptr ; procedure_ptr != NULL;
         procedure_ptr = procedure_ptr->next_procedure)
    {
    /* loop through instruction sequence looking for 8 bit displacement
       transfer of control instructions */
```

FIG. 25 CONTINUED

```
    for (instruction_ptr = procedure_ptr->instruction_ptr ;
         instruction_ptr != NULL;
         instruction-ptr = instruction_ptr->next_instruction)
    }
    if (instruction_ptr->flag & (DISPLACEMENT_8BIT)
    {
/* set next_edit_ptr to first edit beyond current
    instruction offset */
        while ((next_edit_ptr != NULL) &&
              (next_edit_ptr->edited_offset < = instruction_offset))
        {
        next_edit_ptr = next_edit_ptr->next_edit;
/* set previous_edit_ptr to edit before or equal to
    current instruction offset address */
        previous_edit_ptr = next_edit_ptr->previous_edit;
        }
/* destination offset is offset of transfer of
    control destination */
        destination_offset = (signed long) instruction_offset +
            instruction_ptr->instruction_size +
            instruction_ptr->displacement;
        /* if destination offset is beyond current offset */
        if (destination_offset > instruction_offset)
```

FIG. 25 CONTINUED

```
        }
            /* if edits exist beyond current instruction offset */
        if (next_edit_ptr != NULL)
        {
            edited_destination_offset = destination offset;
            edit_ptr = next_edit_ptr;
                /* while edited destination offset is beyond edit */
            while ((edited_destination_offset >
                    (edit_ptr->edited_offset - edit_ptr->delta)) &&
                    (edit_ptr != NULL))
            {
                /* adjust edited_destination_offset by edit delta value */
                edited_destination_offset + = edit_ptr->delta;
                edit_ptr = edit_ptr->next_edit;
            }
            /* adjust instruction displacement by difference in
               original and edited destination offsets */
            instruction_ptr->displacement + =
                (edited_destination_offset - destination_offset);
        }
    }
    /* else destination offset is before
       current instruction offset */
```

FIG. 25 CONTINUED

```
    else
    {
      /* if edits exist before current instruction offset */
      if (previous_edit_ptr != NULL)
      {
        edited_destination_offset = destination_offset;
        edit_ptr = previous_edit_ptr;
          /* while edited_destination_offset is before edit */
          while ((edited_destination_offset < edit_ptr->edited_offset) &&
              (edit_ptr != NULL))
          {
        /* adjust edited_destination offset by edit delta value */
            edited_destination_offset - = edit_ptr->delta;
            edit_ptr = edit_ptr->previous_edit;
          }
          /* adjust instruction displacement by difference
              in original and edited destination offsets */
          instruction_ptr->displacement - =
              (edited_destination_offset - destination_offset);
      }
    }
    /* increment instruction_offset by instruction_size
        before looping to next instruction */
```

FIG. 25 CONTINUED instruction_offset + = instruction_ptr->instruction_size;

```
struct public_node
{
    unsigned int    segment_number;
    unsigned int    offset;
    unsigned char   *public_name_ptr;
};
```

FIG. 28

```
struct relocation_node
{
    unsigned int    ref_segment_number;
    unsigned int    ref_offset;
    unsigned int    refd_segment_number;
    unsigned int    refd_offset;
    unsigned char   relocation_type;
};
```

FIG. 27

```
edit_list    *first_edit_ptr;

adjust_public_tables(unsigned int segment_number)

{ edit_list       *edit_ptr;

public_node     *public_ptr;

unsigned int    delta_total;

delta_total = 0;

public _ptr = get_first_public(segment_number);

/* loop through all edits in an instruction segment */ for (edit_ptr = first_edit_ptr ; edit_ptr != NULL;

edit_ptr = edit_ptr->next_edit)

{

/* adjust all public symbols up to current edit offset address */ while ((public_ptr->segment_number = = segment_number) &&

(public_ptr->offset < = edit_ptr->old_offset))

{ public_ptr->offset + = delta_total;

next_public(&public_ptr);

} delta_total + = edit_ptr->delta;

```
/* adjust public symbols between last edit location
        and end of segment */
while ((public_ptr->segment_number = = segment_number))
    {
    public_ptr->offset + = delta_total;
    next_public(&public_ptr);
    }
}
```

FIG. 30

```
struct segment_list
    {
    segment_ptr     *next_segment;
    segment_ptr     *previous_segment;
    unsigned int    segment_number;
    segment_node    *segment_node_ptr;
    procedure_range *procedure_ptr;
    );
```

FIG. 29

```
edit_list      *first_edit_ptr;

adjust_relocation_tables(unsigned int segment_number)
{
    edit_list       *edit_ptr;
    relocation_node *reference_ptr,
                    *referenced_ptr;
    unsigned int    delta_total;

delta_total = 0;
    reference_ptr = get_first_relocation_ref(segment_number);
    referenced_ptr = get_first_relocation_refd(segment_number);
        /* loop through all edits in an instruction segment */
    for (edit_ptr = first_edit_ptr ; edit_ptr != NULL;
        edit_ptr = edit_ptr->next_edit)
    {
        /* adjust all relocation references up to current edit offset address */
        while ((reference_ptr->ref_segment_number = = segment_number) &&
            (reference_ptr->ref_offset < = edit_ptr->old_offset))
        {
```

FIG. 29 CONTINUED

```
        reference_ptr->ref_offset += delta_total;

next_relocation_ref(&reference_ptr);

}

/* adjust all referenced addresses up to current edit offset address */ while ((referenced_ptr->refd_segment_number == segment_number) &&

(referenced_ptr->refd_offset <= edit_ptr->old_offset))

{ referenced_ptr->refd_offset += delta_total;

next_relocation_refd(&referenced_ptr);

} delta_total += edit_ptr->delta;

}

/* adjust all relocation reference addresses between
       last edit location and end of segment */ while ((reference_ptr->ref_segment_number == segment_number))

{ reference_ptr->ref_offset += delta_total;

next_relocation_ref(&reference_ptr);

```
/* adjust all referenced addresses between last edit
    location and end of segment */
while ((referenced_ptr->refd_segment_number = = segment_number))
{
}
referenced_ptr->refd_offset + = delta_total;
next_relocation_refd(&referenced_ptr);
}
}
```

FIG. 31

```
adjust_proc_mov_public_symbol(unsigned int segment_number)
{
    segment_list      *segment_ptr;
    public_node       *public_ptr;

procedure_range   *procedure_ptr
                      *next_procedure_ptr;

unsigned int      procedure_offset,
                      next_procedure_offset,
                      removed_procedure_size,
                      new_segment_number,
                      offset_delta;
```

FIG. 31 CONTINUED

```
procedure-offset = 0;

next_procedure_offset = 0;

removed_procedure_size = 0;

segment_ptr = get_segment(segment_number);

public_ptr = get_first_public(segment_number);

for (procedure_ptr = segment_ptr->procedure_ptr ; procedure_ptr != NULL;)
{
  next_procedure_offset + = procedure_ptr->procedure_size;

next_procedure->ptr = procedure_ptr->next_procedure;

/* if procedure has been assigned to a new segment or deleted */ if ((procedure_ptr->new_segment != NULL) ||

(procedure_ptr->flag & DELETE))
  {
    removed_procedure_size + = procedure_ptr->procedure_size;

/* remove procedure_ptr from old procedure range list */ remove_from_procedure_list(procedure_ptr);

/* if procedure is not to be deleted then
         add to new segment list */ if (procedure_ptr->flag != DELETE_PROC)
    {
        /* set new_segment_procedure_ptr to the end of the new segment's
           procedure list. */
```

FIG. 31 CONTINUED

```
            new_procedure_offset =
                add_procedure_to_segment(procedure_ptr->new_segment);
            new_segment_number = procedure_ptr->new_segment->segment_number;
                /* set offset_delta for public symbol adjustments */
            offset_delta = new_procedure_offset - procedure_offset;
            }
        else /* else procedure is to be deleted so freeup
                    data storage area */
            {
            free_procedure(procedure_ptr);
            }
        }
    else /* else not moved or deleted */
        {
        /* assign total negative removed size to offset_delta */
        offset_delta = (-removed_procedure_size);
        /* assign original segment number because procedure not moving */
        new_segment_number = segment_number;
        } while ((public_ptr->segment_number = = segment-number) &&
            (public_ptr->offset < next_procedure_offset))
        {
```

FIG. 31 CONTINUED

```
if (!(public_ptr->flag & DELETE))
    {
    public_ptr->offset + = offset_delta;

public_ptr->segment_number = new_segment_number;
    } next_public(&public_ptr);
}

/* set procedure_ptr to next procedure in original segment */
procedure_ptr = next_procedure_ptr;

procedure_offset = next_procedure_offset;
}
```

POST COMPILE OPTIMIZER FOR LINKABLE OBJECT CODE

FIELD OF THE INVENTION

This invention relates to the post compile/assemble optimization of object code machine instruction data, specifically to an optimization process based upon analysis of the complete object code data set to be linked into an executable program.

BACKGROUND OF THE INVENTION

Heretofore, optimization processes have been performed as a step in the initial object code generation process. These processes are limited to performing optimizations based upon information derived from the source code data being translated into a single object code module. These single object code module optimizations fail to utilize the additional optimization analysis information available from the complete object code data set that is to be linked in order to form an executable program.

A complete object code data set optimization analysis process had not previously been considered feasible in part due to the absence of a suitable method of ensuring correct interpretation of disassembled machine instruction data. This correct interpretation difficulty results from the potential presence of both program data and machine instruction data within an object code instruction segment.

DESCRIPTION OF THE PRIOR ART

Prior art object code data machine instruction disassemblers utilize all available information within an object code module in order to attempt a best effort at differentiating between program data and machine instruction data. This information includes symbol data, relocation data, and transfer of control instruction displacement values. This information is used in order to detect cases where instruction segment data cannot represent syntactically correct machine instructions. If a public symbol is found to be located at an address that does not fall on an instruction boundary, then it can be determined that the instruction segment contents at that address are to be considered program data rather than machine instruction data. If a transfer of control instruction displacement value indicates a transfer of control destination address that does not fall on an instruction boundary, then it can be determined that the instruction segment contents at the transfer of control instruction address are to be considered program data rather than machine instruction data. If relocation data indicates that a relocation reference is located at an instruction segment address and the instruction at that address does not allow a relocation reference, then it can be determined that the instruction segment contents at that address are to be considered program data rather than machine instruction data.

Relocatable program data is distinguishable from machine instruction data within an instruction segment due to symbol or relocation data referencing. Non relocatable program data, however, cannot always be detected. It is impossible to interpret with certainty the contents of every instruction segment range as being instruction data or non relocatable program data relying solely upon the usual information found in an object code module. This is because of the possible existence of instruction segment non relocatable program data which resembles a syntactically correct machine instruction and cannot be distinguished from that machine instruction relying on the usual information found in an object code module.

Another obstacle to successful complete object code data set optimization had occurred due to the difficulty involved in determining the destinations of indirect transfer of control instructions. Indirect transfer of control instructions jump to or call instruction addresses that reside in variables or processor registers. Any machine instruction address could potentially serve as a destination for an indirect transfer of control instruction. Because of this, it is difficult to determine adequate control flow information corresponding to a set of object code data. This lack of adequate control flow information restricts the possible set of optimizations that can be performed on such a set of object code data.

OBJECTS OF THE INVENTION

Accordingly, several objects and advantages of the invention are:

(a) Facilitation of a class of optimizations that can be performed based upon analysis of a complete object code data set. The term "complete object code data set" is used within this application when referring to all of the object code data that is to be linked in order to form executable program data. Register parameter passing conversion, non accessed code deletion, far displacement to near displacement instruction conversion, and procedure end stack clearing conversion are all significant optimizations which fall into this class. These listed optimizations have been successfully implemented in the preferred embodiment of the invention.

(b) Facilitation for the indication of the set of all possible incorrectly interpreted instruction segment ranges within a complete set of object code data. These indicated instruction segment ranges contain non relocatable program data and thus the possibility for incorrect machine instruction interpretation exists within these ranges. The term "static instruction range" is used within this application when referring to one of these indicated instruction segment ranges. This static instruction range indication ensures correct object code machine instruction data interpretation within the instruction segment ranges excluded from the indication.

(c) Effective isolation, during optimization analysis, of the data within the static instruction ranges indicated in (b) above from the data within the remainder of the instruction segment ranges. This allows for optimizations to be performed on machine instruction data within ranges not indicated in (b) while the data located within those ranges indicated in (b) is designated as static and is not modified.

(d) Indication of the set of all possible indirect transfer of control destination instruction segment ranges within a complete object code data set. This indication permits the sufficient formulation of control flow information required for the optimizations listed in (a) to be performed on a machine instruction set which includes indirect transfer of control instructions.

(e) Indication of the set of all possible external process transfer of control destination ranges within a complete object code data set. These destination ranges contain control flow entry points into a program whereby the transfer of control into these points is initiated by external processes. This indication permits the sufficient formulation of control flow information required for the optimizations listed in (a) to be performed on object code data that is generated in a multiple process operating system environment.

SUMMARY OF THE INVENTION

The present invention achieves the foregoing objects and allows for optimizations to be performed on a complete object code data set to be linked into an executable program. Because these optimizations are based upon analysis of a complete set of object code data, they constitute an additional class of optimizations not included in the standard class of optimizations that can performed during the single object code data module generation process. This additional class of optimizations allows for improved program execution efficiency.

BRIEF DESCRIPTION OF THE DRAWINGS

FIG. 1 shows the complete object code data set optimization stage within the traditional program creation process.

FIGS. 3A and 3B show possible forms of the static instruction range specification data.

FIGS. 18 through 31 provide code for performing various routines.

DETAILED DESCRIPTION OF THE PREFERRED EMBODIMENT

Figure 2:
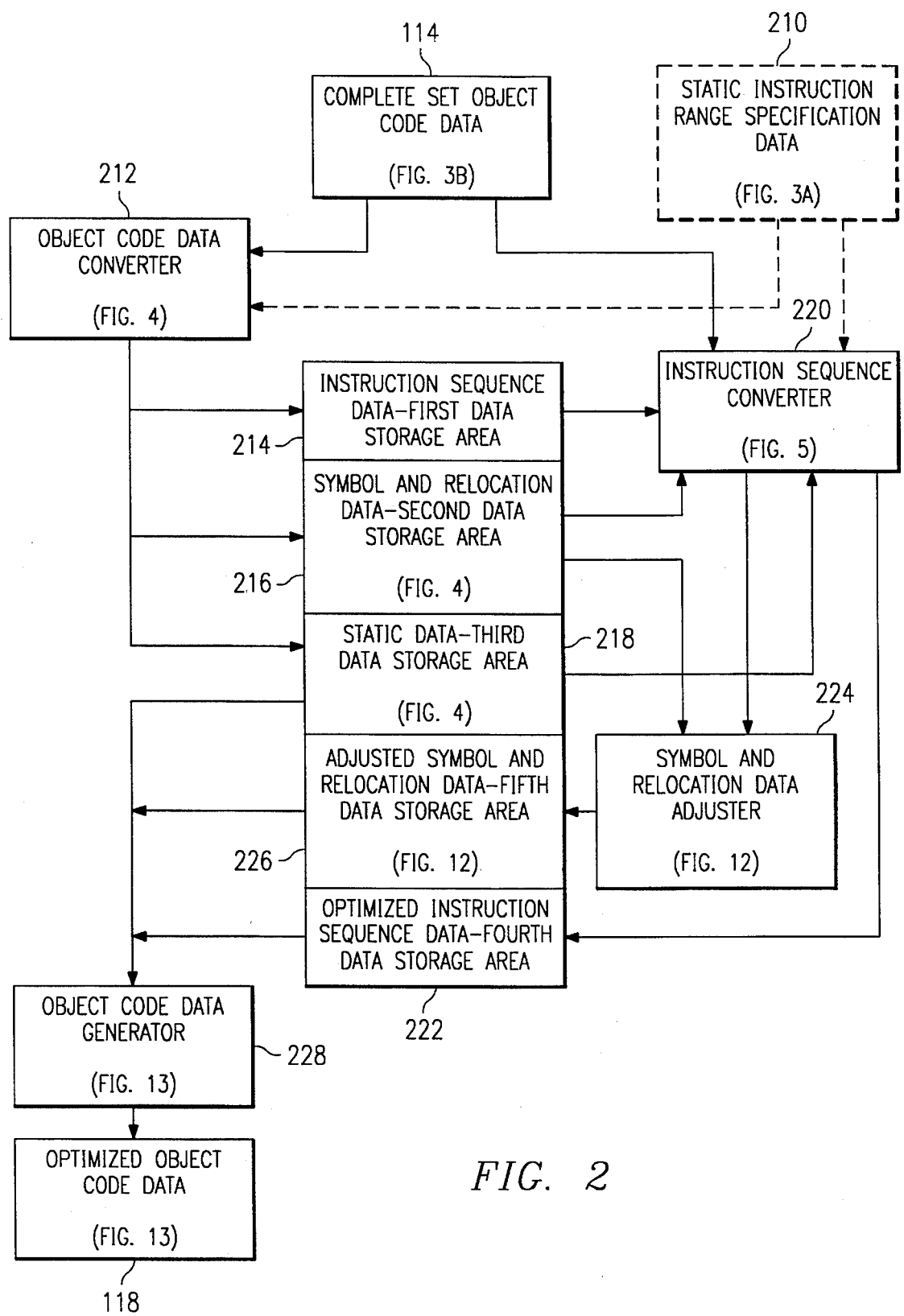
FIG. 2 shows the components comprising the complete object code data set optimization process.

A typical embodiment of the invention within the traditional executable program creation process is shown in FIG. 1. All of the source code data (110), that produces the complete object code data set to be linked in order to form executable program data, is first processed by a compiler and or assembler (112). The generated complete object code data set (114) is input into the invention (116) prior to the link process. The invention optimizes the object code data based upon analysis of information obtained from this complete object code data set. The invention generates optimized object code data (118) suitable for input to the linker. The linker (120) generates optimized executable program data (122).

The components of the invention are shown in FIG. 2. The object code converter (212) processes a complete object code data set (114) and generates instruction sequence data (214), symbol and relocation data (216), and static data (218) to be stored in their respective data storage areas. Static instruction range specification data (210) may also processed by both the object code converter (212) and the instruction sequence converter (220). The instruction sequence converter (220) generates optimized instruction sequence data (222). The symbol and relocation data adjuster (224) generates adjusted symbol and relocation data (226) which corresponds to the optimized instruction sequence data (222). The object code generator (240) converts the static data (218), adjusted symbol and relocation data (226), and optimized instruction sequence data (222) into optimized object code data (118).

Figure 14A:
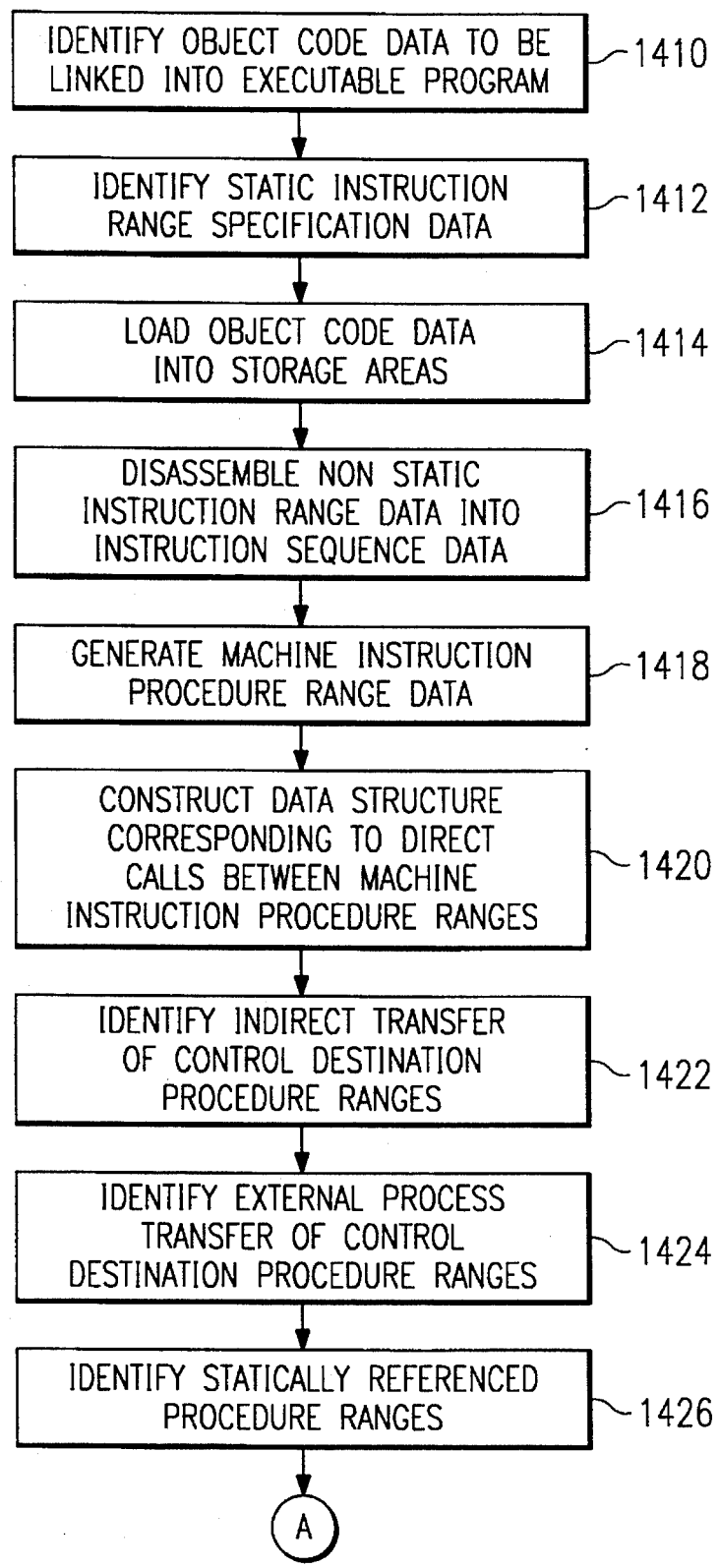
FIGS. 14A and 14B describe the steps performed by the complete object code data set optimization process.
Figure 14B:
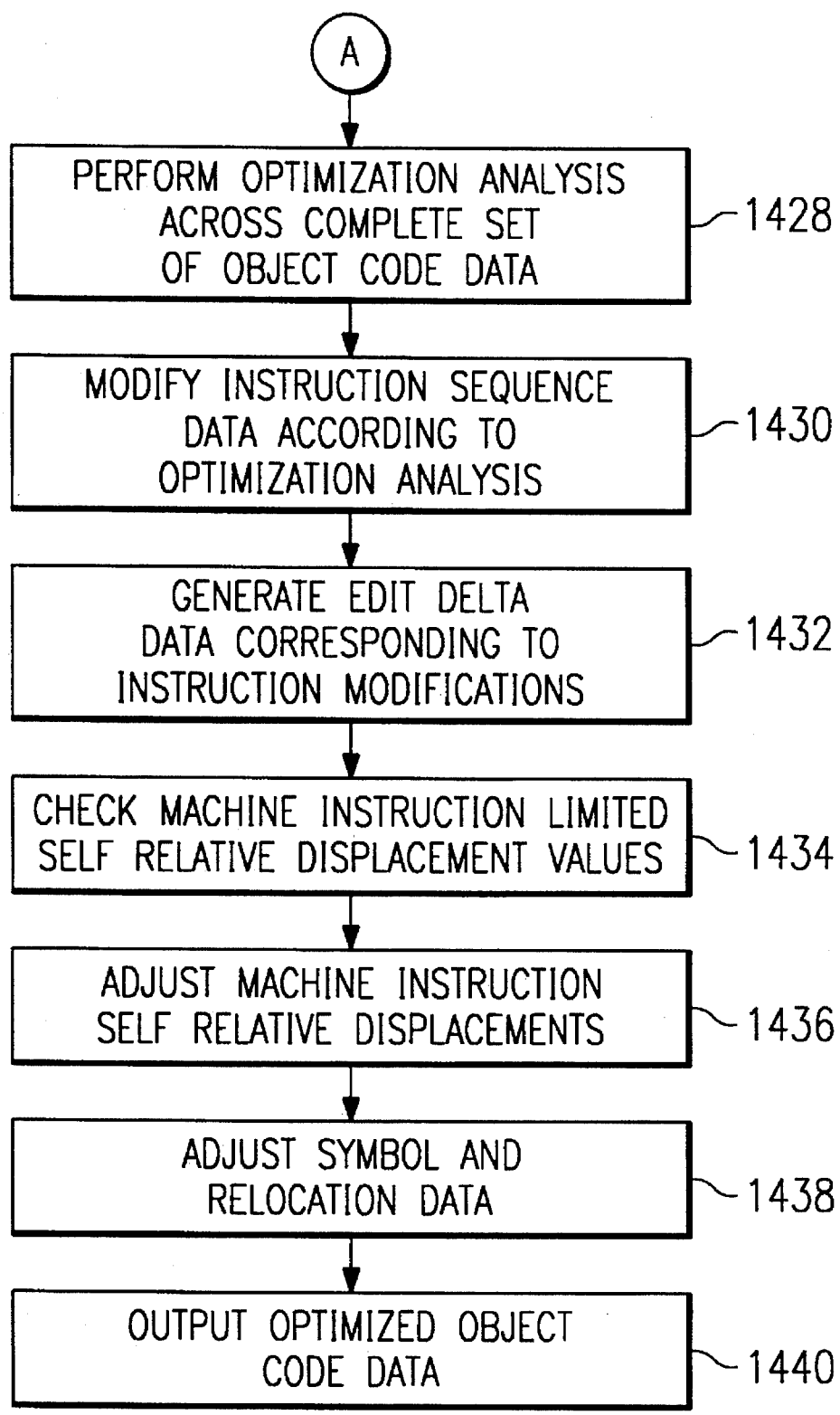
Figure 15A:
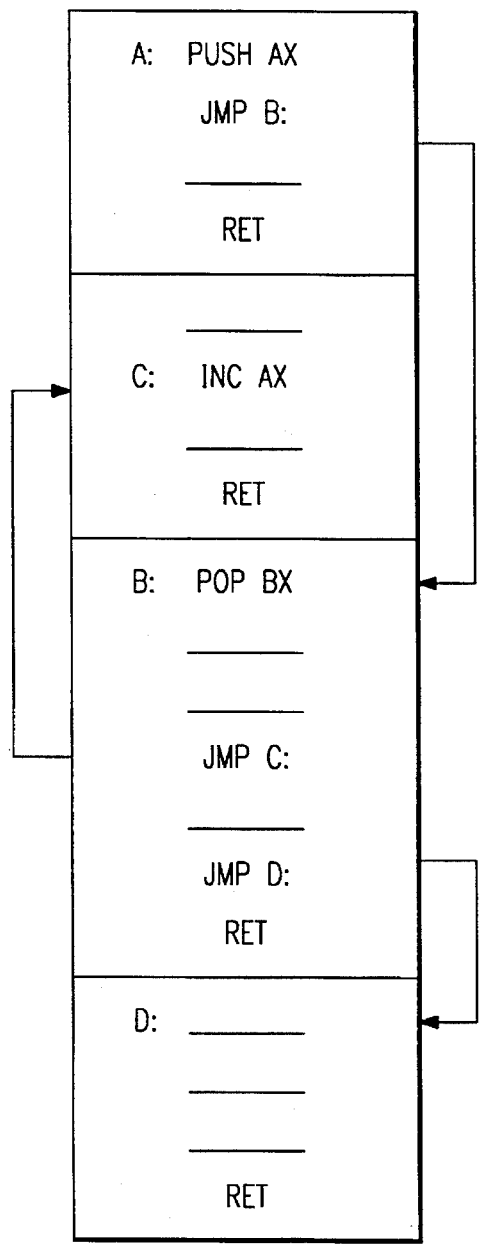
FIGS. 15A and 15B show examples of types of machine instruction procedure ranges.
Figure 15B:
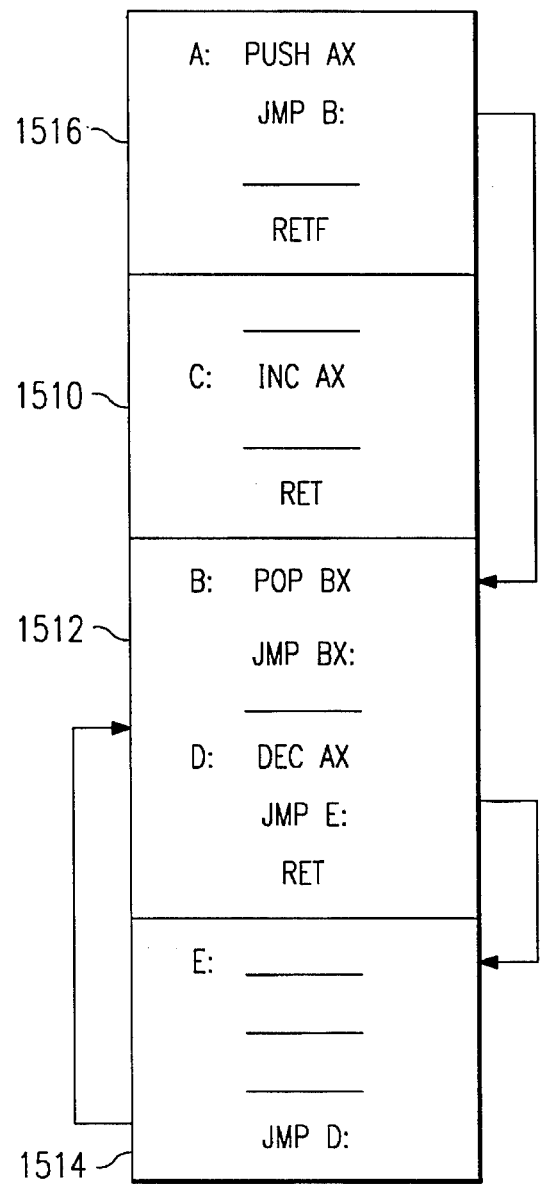
Figures 16, 17:
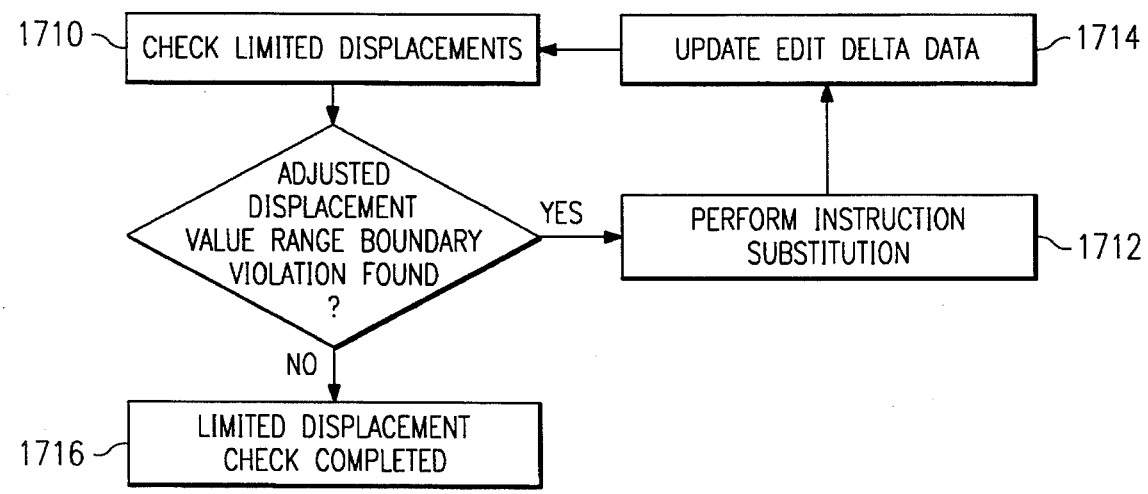
FIG. 16 shows the edit delta data table to be used for symbol and relocation data adjustments and also for instruction displacement adjustments.
FIG. 17 shows the flowchart used for adjusted limited displacement range checking.

The components that comprise the complete object code data set optimization process are shown in FIGS. 2 through 13. The steps performed by these components are outlined in FIGS. 14A and 14B. FIGS. 15 through 17 are also referred to during this discussion in order to provide the reader additional descriptions of the features and operations performed by the invention.

The location of the complete object code data set (114) to be input into the invention (step 1410) must first be specified. This specification is similar to the normal linker input specification. The locations of all application object code data along with any object code libraries that contain object code data referenced by the application object code data are specified.

Information specifying the location of all static instruction ranges (210) within the complete object code data set is input into the invention (step 1412). These static instruction ranges contain instances where possible incorrect machine instruction interpretations may occur. Because these ranges cannot be accurately interpreted, they are not converted into instruction sequence data and are not modified by the instruction sequence converter (220). The static instruction range specification data may be retrieved from within the actual object code data locations themselves (FIG. 3B) or it may be retrieved from a separate memory location (FIG. 3A). If it is located in the object code data memory area, then the static instruction range specification data may be in the form of an object code record which specifies the static instruction ranges in terms of begin and end segment offset address boundaries within an instruction segment (316).

This preferred method of specifying static instruction ranges allows for a more precise delineation these ranges. A conforming compiler or assembler is required in order to generate object code data corresponding to the conventions of this specification method. If the static instruction range specification data is located in the separate memory location, then it may be specified as encompassing an entire object code module (310) or object code library (312). This method of specifying static instruction ranges is required in cases where compilers or assemblers do not generate the object code record data (316) shown in FIG. 3B. This specification method is the less precise and therefore the less preferred of the two methods. The static instruction range specification data shown in a separate memory area (210) from the object code data is drawn with hatched lines in FIG. 2 in order to denote its less preferred status. Because it is shown in a distinct form, this static instruction range specification (210)

will serve as a reference to either static instruction range specification type within this application.

Figure 4:
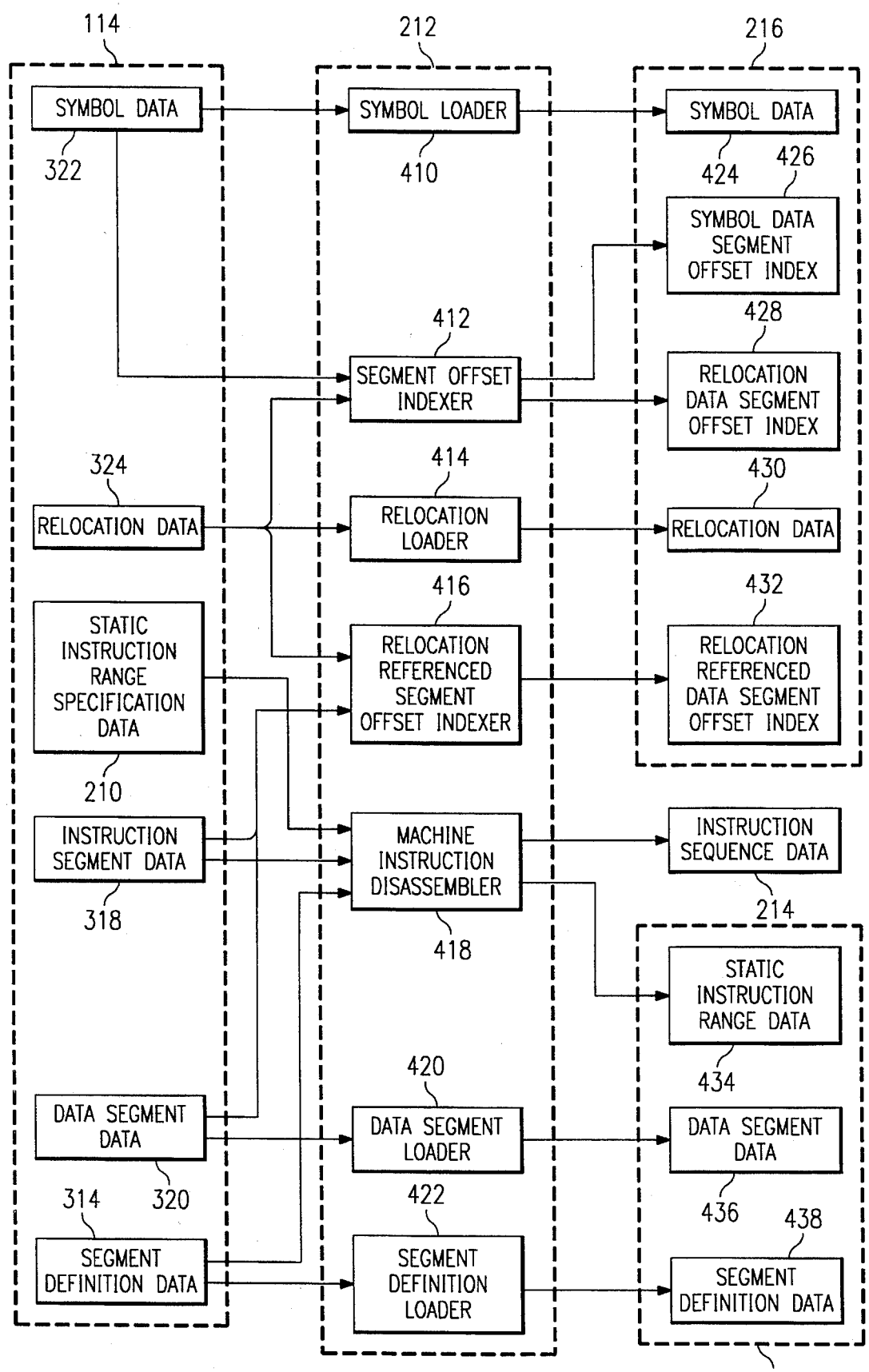
FIG. 4 shows the components of the object code data converter shown in FIG. 2.

The object code converter (212) reads the object code data and stores components of this data into a plurality of storage areas (step 1414). This object code converter is shown in FIG. 4.

Symbol data (322) and relocation data (324) are loaded by their respective loaders (410 and 414) into symbol (424) and relocation (430) data tables in the corresponding storage area (216), These data tables are indexed in order to allow the necessary adjustments to be performed corresponding to possible subsequent machine instruction edits, The segment offset indexer (412) generates index data based upon on a symbols' segment offset addresses (426). This indexing allows for the necessary symbol data adjustments to be performed corresponding to possible subsequent instruction edits in the cases where the symbols are located within instruction segments, The segment offset indexer (412) also generates index data based upon the segment offset address where relocation data references are found (428), The relocation data is additionally indexed by the relocation referenced segment offset indexer (416), based upon the referenced .segment offset address (432), This referenced segment offset address is typically loaded into the relocation reference segment offset address by the linker or program loader. These two indexes are necessary because relocation information always contains both the relocation reference segment offset address and the referenced segment offset address, This double indexing allows for necessary adjustments to be performed on relocation data corresponding to possible subsequent machine instruction edits. FIG. 18 provides an assembly language listing shown in order to further explain this double indexing of relocation data.

The first column in the listing shows the segment offset address for each machine instruction in the listing. The second column shows the actual machine instructions that are generated by the assembler, along with any relocation references corresponding to the generated machine instructions. The third column contains the source code that the assembler has translated into the machine instructions in the second column. There are two instruction segments in the listing, SEG1_TEXT and SEG2_TEXT. SEG2_TEXT contains three relocation references at segment offset addresses 0002, 0005, and 0008. These relocation references would be indexed according to their segment offset addresses so that these addresses can be adjusted corresponding to any possible subsequent machine instruction edits.

The data to be stored in these three relocation reference addresses is to be set to the value of the segment offset addresses of the procedures seg1_proc1, seg1_proc2, and seg2_proc. The relocation data is secondly indexed on these referenced segment offset addresses. The first relocation reference located at segment offset address 0002 in the SEG2_TEXT segment would be secondly indexed on the segment offset address of seg1_proc1, in this case segment SEG1_TEXT offset address 0000. The second relocation reference located at segment offset address 0005 in the SEG2_TEXT segment would be secondly indexed on the segment offset address of seg1_proc2, in this case segment SEG1_TEXT offset address 0001. Finally the third relocation reference located at segment offset address 0008 in the SEG2_TEXT segment would be secondly indexed on the segment offset address of seg2_proc, in this case segment SEG2_TEXT offset address 0000. This second relocation data index enables the necessary adjustment of referenced segment offset addresses corresponding to possible subsequent machine instruction edits.

The relocation referenced segment offset indexer (416) may in some cases extract the referenced offset value from either instruction segment (318) or data segment (320) contents. The above assembly listing shows the SEG2_TEXT instruction segment containing the referenced offset value 0001 at address 0005. This referenced offset value is utilized for the aforementioned secondary relocation data indexing and is also loaded into the relocation data (422) for possible subsequent adjustments.

The machine instruction disassembler (418) loads all static instruction range data (434) from the instruction segment data as specified by the static instruction range specification data (210). The segment definition data (314) is inspected during this static instruction range specification. The static instruction range data is not disassembled because of the possibility of incorrect machine instruction interpretation. This static instruction range data is loaded in the static data memory area (218). The data segment loader (420) and the segment definition loader (422) store the data segment contents (436) along with the segment definition data (438) into this same static data area.

The machine instruction disassembler (418) disassembles all instruction segment ranges not indicated as static (step 1416). The instruction disassembly process utilizes current technology similar to that which is found in any commercial object code disassembler. Instruction segment contents are disassembled into machine instruction and relocatable program data sequences which are stored in their respective storage area (214). The term "instruction sequences" is used within this application when referring to these machine instruction and relocatable program data sequences.

Figure 5:
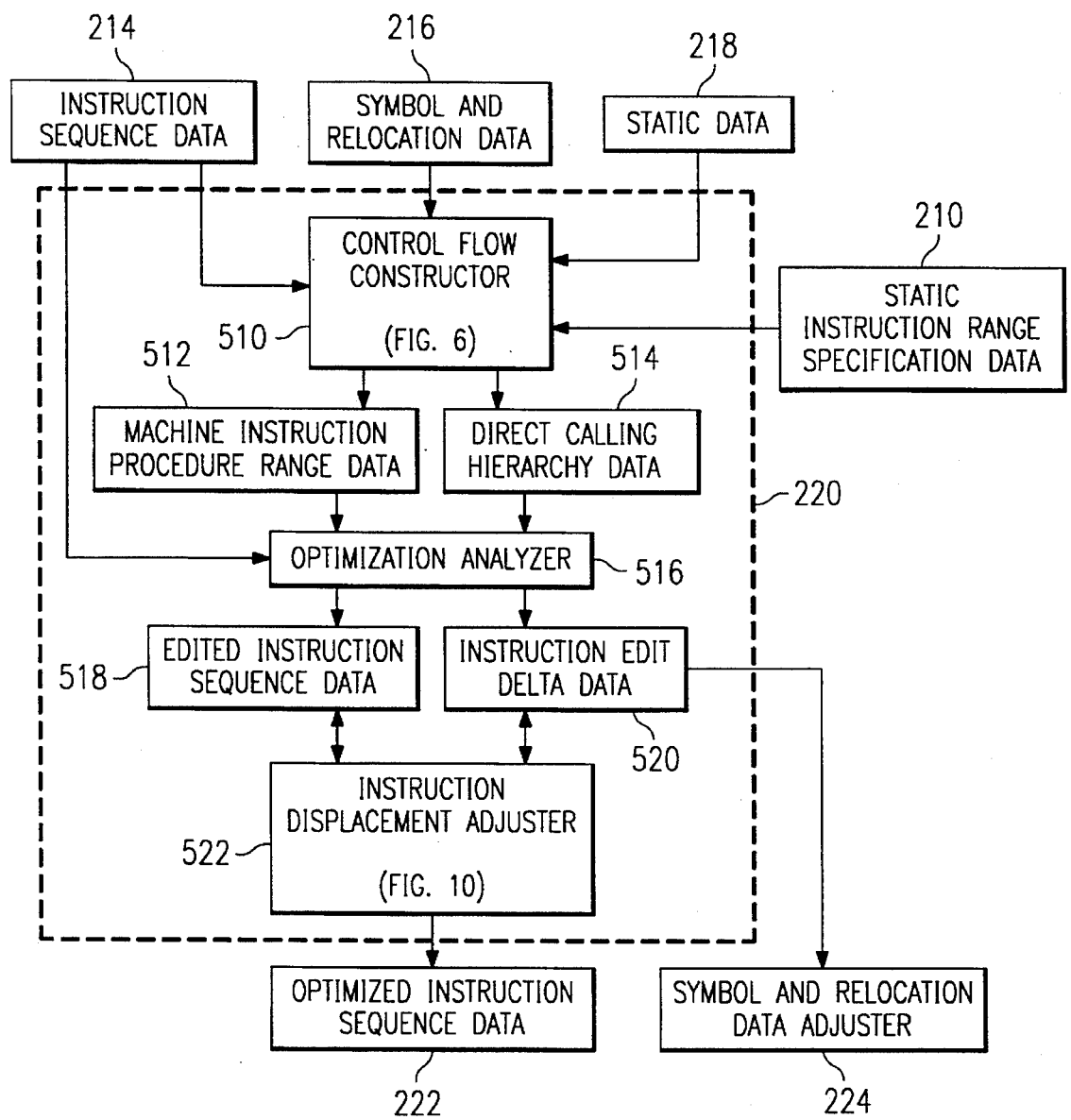
FIG. 5 shows the components of the instruction sequence converter shown in FIG. 2.
Figure 6:
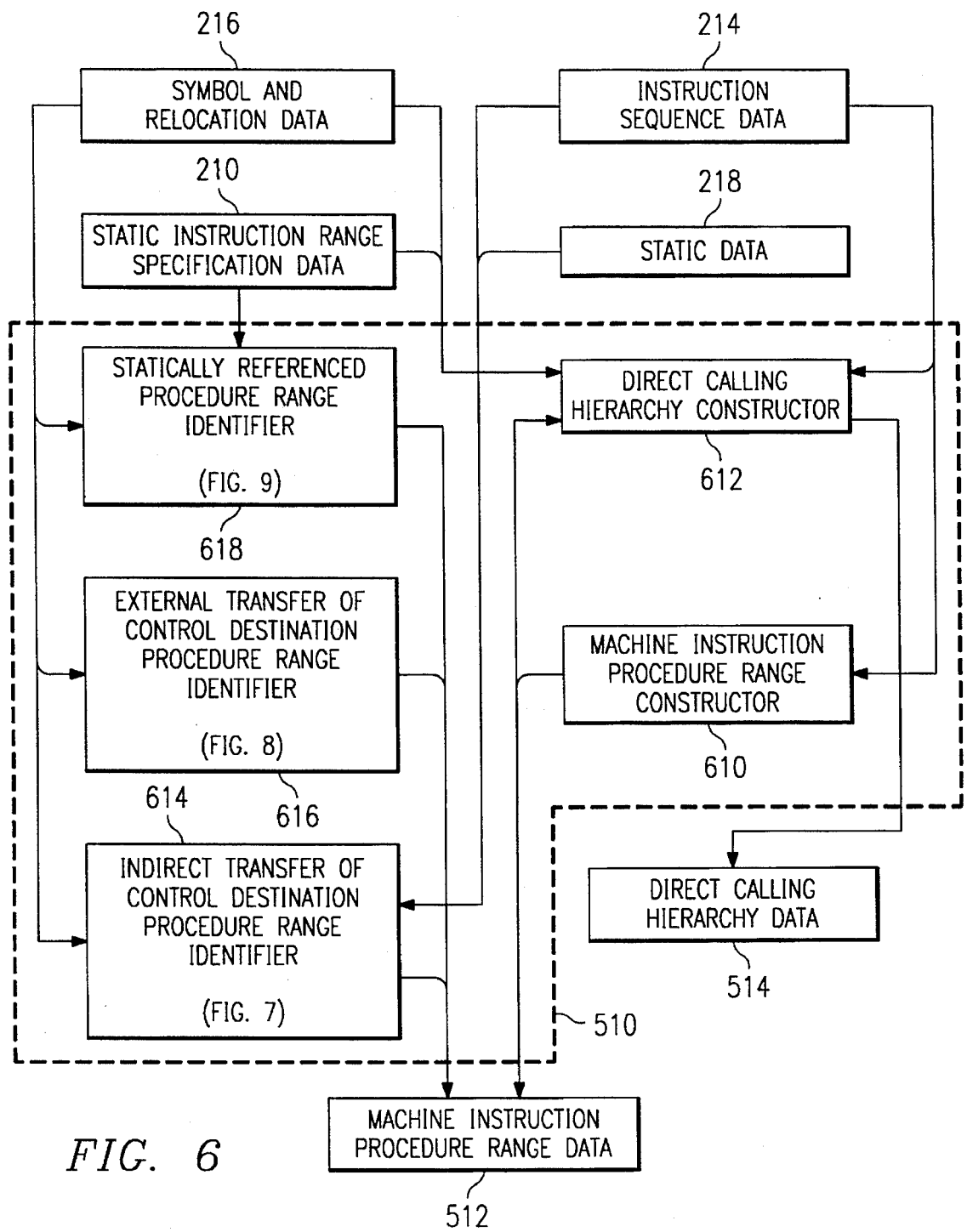
FIG. 6 shows the components of the control flow constructor shown in FIG. 5.

The components that comprise the instruction sequence converter (220) are shown in FIG. 5. The control flow constructor (510) analyzes instruction sequence data (214), symbol and relocation data (216), static data (218), and static instruction range specification data (210) and generates control flow information in the form of machine instruction procedure range data (512) and direct calling hierarchy data (514). The components that comprise the control flow constructor are shown in FIG. 6.

The machine instruction procedure range constructor (610) groups the instruction sequence data (214) into machine instruction procedure ranges (step 1418) which closely delineate higher level programming language procedures or functions. These machine instruction procedure ranges may contain multiple control flow entry and exit paths. This requirement is due to the potential control flow complexity of any arbitrary sequence of machine instructions. The formulation of a machine instruction procedure range involves a two step process. First, machine instructions are grouped together by matching a return instruction with the sequence of all preceding relocatable program data items and instructions, up to but not including the previous return instruction, if it exists. Most processor instruction sets include one or more types of return instructions so this grouping applies across the majority of processor platforms. This initial grouping may be performed during the instruction disassembly (step 1416) if desired. Next the machine instruction procedure range constructor (610) consolidates these groups into machine instruction procedure ranges (512) by connecting direct transfer of control jump instructions between the groups as shown by the arrows in FIG. 15A. Memory accessing instructions are also connected in cases where instruction segment variables are referenced.

Irregular characteristics are recognized by the machine instruction procedure range constructor (610) in order to prevent certain optimizations from being performed on the machine instruction procedure ranges that contain these characteristics. Some of these irregular characteristics are illustrated in FIG. 15B. If the procedure group consolidations result in non contiguous procedure ranges (group 1510 is not included in the surrounding procedure range) then the machine instruction procedure range is flagged due to its irregular nature. Any machine instruction procedure range that contains an indirect jump instruction (1512) is flagged due to the indeterminate nature of the procedure range. Any machine instruction procedure range that contains an end of segment instruction other than a return instruction (1514) is flagged due to the irregular nature of the range. Any machine instruction procedure range that contains dissimilar return instruction types is flagged due to the irregular nature of the range (1516).

Additional irregular characteristic inspections must be included as required by any additionally implemented optimizations. If register parameter passing conversion is to be implemented, for example, then all expected existing stack setup and stack clearing instructions are checked for in a procedure range. If all of these expected instructions are not found, then the procedure range contains irregular stack based parameter passing. This irregular stack based parameter passing cannot be converted to register parameter passing so the procedure range is flagged to prevent this conversion.

The direct calling hierarchy constructor (612) generates direct calling hierarchy data (514) which corresponds to the direct calling hierarchy between the machine instruction procedure ranges (step 1420). Machine instruction procedure range data (512) and instruction sequence data (214) are inspected in order to generate this direct calling hierarchy data. Symbol and relocation data (216) is used in constructing this hierarchy tree in order to resolve calls through relocation data and calls through external symbols to their corresponding public symbols' machine instruction procedure ranges. Static instruction range specification data (210) is used to determine if a direct call transfers control into a static instruction range instead of a machine instruction procedure range. In the preferred embodiment, this data is in the form a hierarchy tree which is constructed by assigning pointer structures between the called and calling procedure ranges. Recursive procedure calls are represented by a call pointer from a procedure range assigned back to that same procedure range. Segment offset values accompany these call pointer structures in order to enable the identification the actual call instruction within the instruction sequence data. This actual call pointer structure is shown in FIG. 19.

The structure is used to construct a double linked list that is connected to a calling machine instruction procedure range. This list contains data representing each call instruction within the calling procedure range. The offset field allows for identification of the actual call instruction within the instruction sequence data. The call_flag field contains data representing the call instruction type. The called_proc_ptr field holds the pointer to the called machine instruction procedure range.

The direct calling hierarchy structure is to be utilized for control flow analysis and data flow analysis during the optimization analysis stage.

Figure 7:
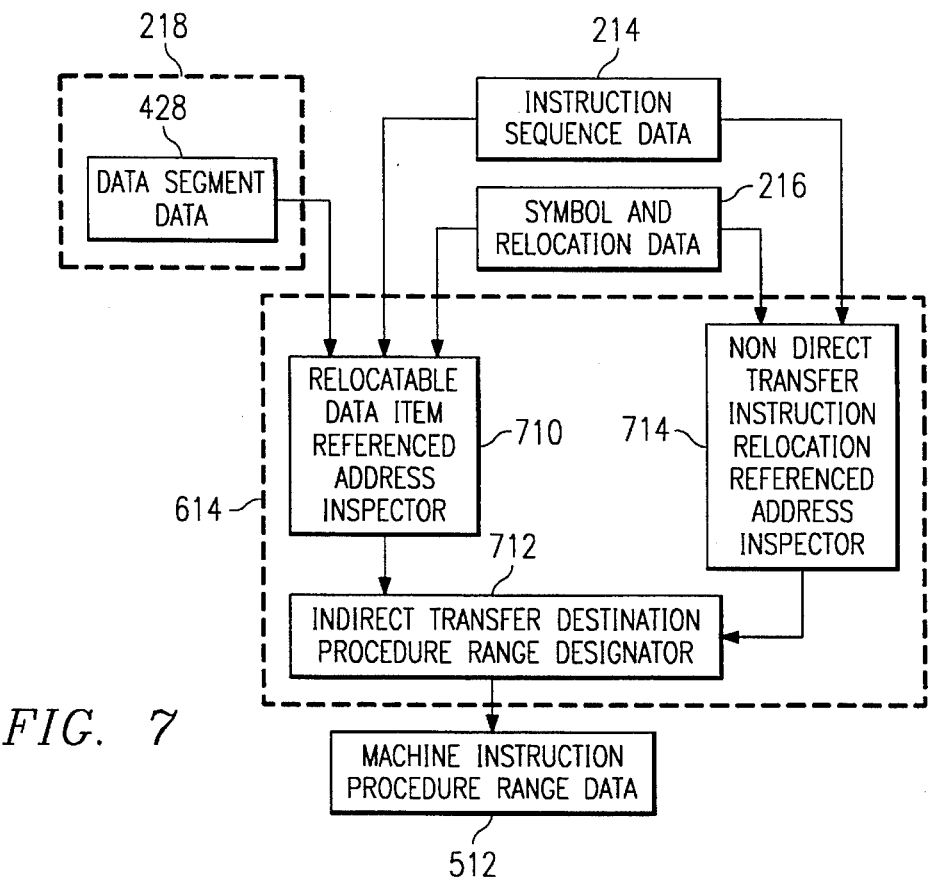
FIG. 7 shows the components of the indirect transfer of control destination procedure range identifier shown in FIG. 6.

The indirect transfer of control destination range identifier (614) identifies all potential indirect transfer of control destination machine instruction procedure ranges (step 1422). This indirect transfer of control destination range identifier is shown in FIG. 7. It can be shown that there are distinct areas within the complete set of object code that contain information from which these ranges can adequately be identified. Specifically, any indirect transfer of control destination instruction address must originate from an explicit declaration of that address within the complete set of object code. There are methods in which to formulate instruction addresses that bypass this explicit declaration requirement, but these methods constitute obscure programming practices and can thus be established as insignificant. It because of this obscure programming possibility that the term "adequately" is used in the second sentence of this paragraph. All explicit indirect transfer of control destination address declarations can be derived from two locations within the complete set of object code.

First, each relocatable program data item found in either the instruction sequence data (214) or data segment contents (436) within the static data (218) are inspected by the relocatable data item referenced address inspector (710), in order to determine if a referenced instruction segment offset address is to be initialized into the relocatable program data item. Symbol and relocation data (216) is utilized in order to determine referenced segment offset addresses during this inspection process. If an instruction segment offset address is to be initialized into a relocatable program data item, then the indirect transfer destination procedure range designator (712) identifies the machine instruction procedure range which contains the referenced address as a potential indirect transfer of control destination procedure range. Next, each machine instruction that is not a direct transfer of control instruction within the instruction sequence data (214) is inspected by the non direct transfer instruction relocation referenced address inspector (714), in order to determine if an instruction segment offset address is to be initialized into a relocation reference within the machine instruction.

Again, symbol and relocation data (216) is utilized in order to determine referenced segment offset addresses during this inspection process. If an instruction address segment offset is to be initialized into a relocation reference within a non direct transfer of control instruction, then the indirect transfer destination procedure range designator (712) identifies the machine instruction procedure range which contains the referenced address as a potential indirect transfer of control destination procedure range.

Figure 8:
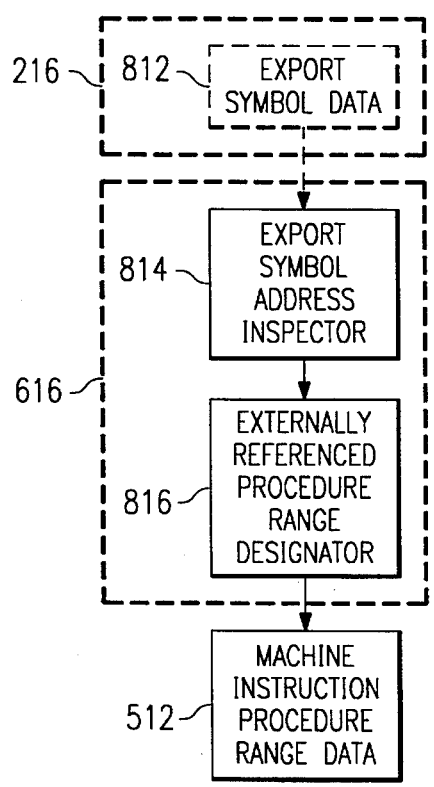
FIG. 8 shows the components of the external transfer of control destination procedure range identifier shown in FIG. 6.

The external transfer of control destination range identifier (616) identifies all machine instruction procedure ranges that are potential transfer of control destinations originating from external processes (step 1424). External process transfer of control destinations would possibly be present in a multiple process operating system environment. In a single processing environment, the executable program start address is designated as the single external process transfer of control destination. This range identifier is shown in FIG. 8. Declarations containing external transfer of control destination addresses are located in the export symbol area (812) within the symbol and relocation data (216). The export symbol address inspector (814) examines the contents of this export symbol data (812), and identifies the machine instruction procedure ranges that contain the declared external transfer of control destination addresses. The externally referenced procedure range designator (816) identifies these procedure ranges as potential external process transfer of control destination procedure ranges.

Figure 9:
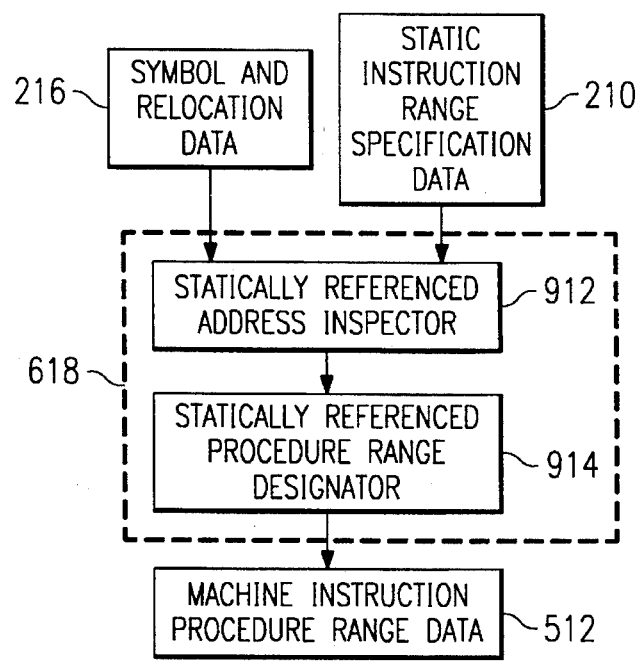
FIG. 9 shows the components of the statically referenced procedure range identifier shown in FIG. 6.

The statically referenced procedure range identifier (618)

identifies procedure ranges that contain referenced instruction segment offset addresses that are to be initialized into relocation reference addresses within static instruction ranges (step 1426). This statically referenced procedure range identifier is shown in FIG. 9. Machine instruction disassembly has not been performed on static instruction ranges, so any referenced instruction segment offset address that is to be loaded into a relocation reference within the static instruction ranges is considered to be a potential transfer of control destination, regardless of the undetermined referencing instruction type. The statically referenced address inspector (912) inspects the static instruction range specification data (210) along with the symbol and relocation data (216) in order to locate these potential transfer of control destinations. The statically referenced procedure range designator (914) identifies the machine instruction procedure ranges that contain the referenced segment offset addresses as "statically referenced" procedure ranges in order facilitate proper isolation between machine instruction data within optimized and static instruction ranges.

The optimization analyzer (516), shown in FIG. 5, examines the information provided by the control flow constructor (510) and formulates optimizations (step 1428) based upon analysis of the complete object code data set. Standard optimization analysis methods such as control flow analysis and data flow analysis are performed on this complete object code data set. The most significant area for potential complete object code data set optimization can be found in the instruction sequence interfaces between calling and called machine instruction procedure ranges. Register parameter passing conversion, far displacement to near displacement calling conversion, and procedure end stack clearing conversion are all preferred embodiment optimizations which involve modification of this calling interface. In order for one of these type optimizations to be performed on a calling interface into a machine instruction procedure range, all machine instruction sequences that perform a transfer of control call into that procedure range must be identifiable. All machine instruction sequences that perform a transfer of control call into the machine instruction procedure ranges designated in steps 1422, 1424 and 1426, however, cannot be accurately identified. Because of this, optimization restrictions are imposed upon these designated machine instruction procedure ranges. Specifically, optimizations cannot be performed upon the calling interfaces that transfer control into the machine instruction procedure ranges designated in steps 1422, 1424 and 1426. Optimizations are not restricted, however, on calling interfaces originating from within these designated procedure ranges.

The optimization analyzer (516) performs the actual machine instruction editing (step 1430) corresponding to the results of the optimization analysis. This edit process involves the insertion, deletion, and modification of machine instructions within the instruction sequence data. Machine instruction procedure ranges may additionally be transferred from one instruction segment to another in order to facilitate far to near instruction conversions in a segmented architecture environment.

The edit process generates edited instruction sequence data (518). This edited instruction data contains optimized, edited machine instruction opcodes along with transfer of control instruction displacement values which have not yet been adjusted.

Symbol and relocation data and transfer of control instruction displacement values must be adjusted in order to correctly correspond to the machine instruction edits performed. The optimization analyzer (516) generates an instruction edit delta data table (520) for each instruction segment in an object code module in order to facilitate these adjustments (step 1432). This data is shown in table form in FIG. 16. The segment offset address of the machine instruction which follows the inserted, deleted or modified machine instruction is recorded in the table (1610). The machine instruction size change, or delta value (1612), is also included in this table with the address value. An edited instruction segment offset address (1614) is derived from the original address and the sum of all previous machine instruction size changes up to the original address. The information recorded in this data table is sufficient for the necessary adjustment of all symbol and relocation data and transfer of control instruction displacements within an object code module.

Figure 10:
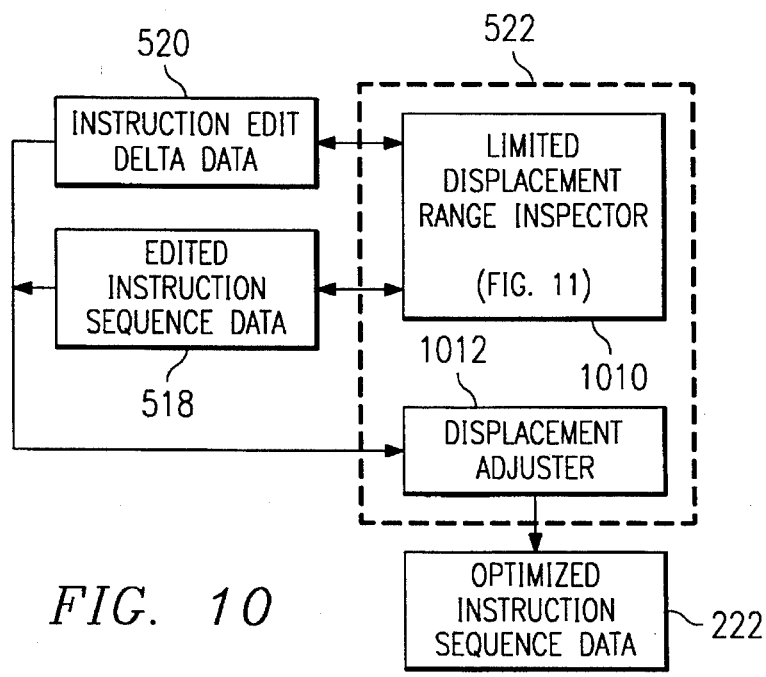
FIG. 10 shows the components of the instruction displacement adjuster shown in FIG. 5.
Figure 11:
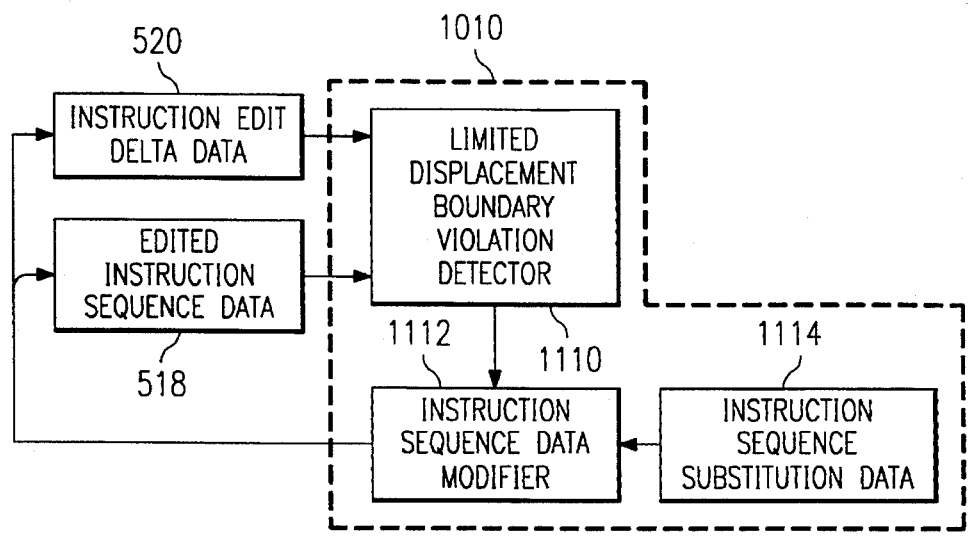
FIG. 11 shows the components of the limited displacement range inspector shown in FIG. 10.

The instruction displacement adjuster (522) next performs the machine instruction limited displacement range check (step 1434). This instruction displacement adjuster is shown in FIG. 10. The limited displacement range inspector (1010) performs a boundary violation inspection on selected instruction sequence data (520). This limited displacement range inspector is shown in FIG. 11. The flowchart for this limited displacement boundary violation inspection, based upon the edit delta data generated in step 1432, is shown in FIG. 17. The limited displacement boundary violation inspection is required in cases where instructions contain self relative displacements that are limited to a range that is less than the addressable segment size. Segment relative displacements by their very definition, contain maximum allowable displacements equal to the addressable segment size, and therefore do not require limited range checking. First, the limited displacement boundary violation detector (1110) inspects all machine instruction self relative limited displacement values, within the edited instruction sequence data (520), in order to detect if necessary adjustments, dictated by the instruction edit delta table (518), would result range boundary violations (step 1710). Any machine instruction insertion or size increase occurring during instruction editing could possibly necessitate a machine instruction limited displacement to be adjusted to a value that exceeds the limited displacement range boundary. If a range boundary violation is found then the instruction sequence data modifier (1112) substitutes a logically equivalent machine instruction sequence into the edited instruction sequence data (516), from the instruction sequence substitution data (1114), for the limited displacement machine instruction (step 1712). This logically equivalent machine instruction sequence contains a displacement range that is sufficient in size for the adjusted displacement. The instruction sequence data modifier (1112) updates the edit delta data table (520) to reflect this machine instruction substitution (step 1714). This substitution results in a machine instruction size increase which could possibly cause additional machine instruction limited displacement range boundary violations. Thus, the machine instruction limited displacement range check is repeated until no additional substitutions are required (step 1716). FIG. 20 shows an instruction that contains a limited self relative displacement and its logically equivalent non limited displacement instruction sequence:

The conditional, jump not greater instruction, jng, in the left column contains an eight bit limited self relative displacement. If the address of a: were to be adjusted to a location that is beyond the eight bit displacement range, then the right column would be substituted into the instruction sequence data. This logically equivalent instruction sequence contains a logically opposite conditional, jump greater instruction, jg, which transfers control around a non conditional jump instruction, jmp. This jump instruction, jmp, contains a non limited sixteen bit displacement which is sufficient in size for the adjusted displacement.

After the machine instruction limited displacement range check is completed, the displacement adjuster (1012), shown in FIG. 10, adjusts the machine instruction self relative displacements within the edited instruction sequence data (518) based upon the edit delta data (520) (step 1436). Adjustments are derived from the algebraic sum of the range of instruction size change values (812) in the edit delta table (520) between the displacement instruction segment offset address and the corresponding displacement destination instruction segment offset address. This sum is added or subtracted to the original instruction displacement in order to formulate an adjusted instruction displacement. The following source code and data structure listing shows the preferred embodiment method of adjusting eight bit transfer of control instruction displacement values. Sixteen or thirty two bit adjustments follow similar logic. FIG. 21 provides the data structures used to construct the instruction sequences and the edit delta tables described previously and are used in the instruction displacement adjustment process.

The instruction_list structure is used for constructing a double linked list containing each machine instruction or relocatable program data item in an instruction sequence. The flag field is used to designate instruction characteristics in order to differentiate various instruction types.

The edit_list shown in FIG. 22 structure is used for constructing a double linked list containing each entry in a edit delta data table (FIG. 16). The old_offset and delta field correspond to the actual machine instruction edits performed on the instruction sequences in an instruction segment. The old_offset field contains the offset address of the instruction that follows an instruction deletion, insertion, or modification. The delta field contains the increase or decrease in instruction size which results from the instruction edit. The edited_offset field is formulated after all edits have been entered into an edit delta data table. The following source code in FIG. 23 illustrates how this edited_offset field is formulated.

The above procedure calculate_edited_offset traverses an edit delta table and keeps a running total of instruction change sizes that occur up to each table entry's segment offset address. The running total is added to the table entry's segment offset address in order to formulate the table entry's edited segment offset address.

The following structure in FIG. 24 is used to build procedure range lists. These lists contain procedure range information corresponding to each instruction segment in an object module.

The instruction_ptr field is assigned the address of the first instruction in an instruction sequence list. The procedure_size field holds the total size of the instructions in that list. The new_segment_ptr field is used to point to the destination segment in cases where the procedure range is to be transferred to another instruction segment. Procedure ranges may be moved to another instruction segment during instruction editing in order to achieve far to near displacement instruction conversion optimizations in segmented architecture environments.

The source code listing in FIG. 25 shows how eight bit instruction displacements are adjusted in an instruction segment's edited instruction sequences corresponding to the entries in an edit delta table. The method shown here derives the adjusted displacement from the edited destination offset address. There are other methods which compute the adjusted displacement value from a known destination instruction. But these methods involve the use of pointers being assigned to the destination instruction from the displacement instruction before instruction editing. This pointer assignment method simplifies the instruction displacement adjustment process at the cost of memory resource utilization. The below listed method illustrates how instruction displacement adjustment can be performed utilizing information derived solely from the instruction sequence data and edit delta data.

The listing first locates the edit delta data table entries that occur before and after the instruction that contains the displacement to be adjusted. These entries serve as starting points for traversal up or down the edit delta table, depending on the direction of the transfer displacement. If the displacement is positive, then the edited destination offset address is calculated by adding the delta values derived from all edit delta data table entries between the instruction offset address and the destination offset address being adjusted. This explanation appears to state that this destination offset address is derived from its own value. Closer inspection of the adjustment loop shows, however, that the edited destination offset value will converge toward its proper address as the delta edit data table traversal converges forward toward this destination offset address.

The difference between edited and original destination offset address values is then added to the instruction displacement in order to formulate an adjusted instruction displacement. If the displacement is negative, then the edited destination offset address is calculated by subtracting the delta values from all edit table value entries between the instruction address and the destination offset address being adjusted. Again, this explanation appears to state that this destination offset address is derived from its own value. Closer inspection of the adjustment loop shows, however, that the edited destination offset value will converge toward its proper address as the edit table traversal converges backwards toward this destination offset address.

Also note in the adjustment comparison that the current edit delta data table entry's delta value is not involved in the comparison, whereas this delta value is involved in the forward displacement adjustment comparison. This is due to the instruction edits being recorded in the edit delta data table at the offset address of the next instruction past the inserted, deleted, or modified machine instruction. Because of this, forward displacement adjustments are formulated differently than backward displacement adjustments. The difference between edited and original destination offset addresses is then subtracted from the instruction displacement in order to formulate an adjusted instruction displacement.

Machine instruction segment relative displacements are referenced in the corresponding relocation data and thus their adjustments are performed during the relocation data adjustments to follow.

After self relative instruction displacements have been adjusted according to the edit delta data, further adjustments may be required if machine instruction procedure ranges are moved or deleted from an instruction segment. Procedure ranges may be moved to another instruction segment during instruction editing in order to achieve far to near displacement instruction conversion optimizations. These optimizations would only apply in a segmented architecture environment. Procedure ranges may be deleted during instruction editing if it is determined that these procedure ranges are not accessed anywhere in the complete set object code data. The additional adjustments are required in these cases only if a self relative instruction displacement transfers control around one or more deleted or moved machine instruction procedure ranges. Every transfer of control instruction displacement of this type must be adjusted by the size of the moved or deleted machine instruction procedure range or ranges.

After instruction displacement adjustment has been completed, the displacement adjuster (1012) generates optimized instruction sequence data and stores this data in its respective data storage area (222).

Figure 12:
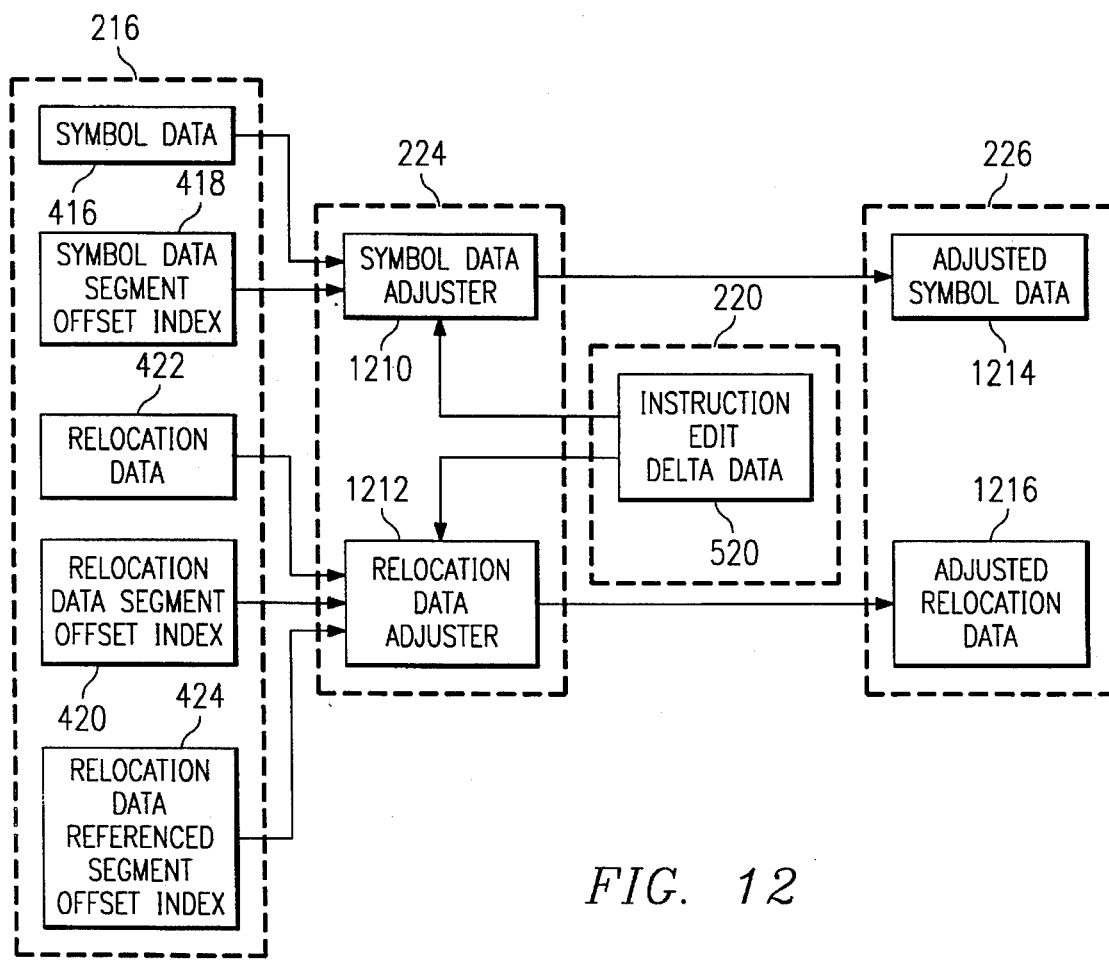
FIG. 12 shows the components of the symbol and relocation data adjuster shown in FIG. 2.

Next, the symbol and relocation data adjuster (224) adjusts the symbol and relocation data, stored in tables, based upon the edit delta data table (step 1438). This symbol and relocation data adjuster is shown in FIG. 12. The adjustment is performed by algebraically summing the range of instruction size change values in the edit delta data table (520) between the segment starting address and the particular symbol or relocation segment offset address value. This sum is then added to the symbol or relocation address value in order to formulate an adjusted address value. The symbol data adjuster (1210) performs this adjustment on the symbol data (416), utilizing the symbol data segment offset index data (418) in order to traverse the symbol data. This symbol data adjuster generates adjusted symbol data (1214) which is stored in the adjusted symbol and relocation data memory area (226).

The public node data structure used to construct the public symbol data table is shown in FIG. 26.

The public_node data structure is used for constructing a public symbol data table. The public symbol data is indexed on the segment offset address where the symbol is located. The source code listing in FIG. 27 illustrates how the public symbol data adjustments are performed.

In the source code listing, the public_ptr is initialized to the first public symbol in a particular instruction segment. The edit delta data table corresponding to the instruction segment is traversed and a running total of edit change values up to each edit delta data table entry segment offset address is stored in delta_total. The public symbol table is concurrently traversed and the offset addresses of public symbols that occur previous to the current edit delta data table entry are adjusted by this delta_total. After edit delta data table traversal has been completed, all public symbols that occur between the last edit delta table entry and the end of segment are adjusted by the final delta_total value.

Relocation tables are double indexed on both the relocation reference segment offset address and the referenced segment offset address that is to be stored into that relocation reference. Accordingly, the relocation data table is adjusted by traversing both indexes and adjusting both components of the relocation data. Again, these adjustments are performed by algebraically summing the range of instruction size change values in the edit delta data table (520) between the segment starting address and the relocation reference or referenced segment offset address value. This sum is then added to the relocation reference or referenced segment offset address value in order to formulate an adjusted segment offset address value. The relocation data adjuster (1212) performs this adjustment on the relocation data (422), utilizing the relocation data segment offset index data (420) and the relocation data referenced segment offset index data (424) in order to traverse the relocation data. This relocation data adjuster generates adjusted relocation data (1216) to be stored in the adjusted symbol and relocation data memory area (226).

The relocation node data structure used to construct the relocation data tables in FIG. 28.

The relocation_node data structure holds relocation data which is indexed on the ref_segment_number and ref_offset fields. These fields specify the relocation reference segment offset address. The relocation data is additionally indexed on the refd_segment_number and refd_offset fields. These fields specify the referenced segment offset address that is to be loaded into to relocation reference address by the linker or program loader. The source code listing in FIG. 29 illustrates how the relocation data adjustments are performed.

In the source code listing, the reference_ptr is initialized to the first relocation reference address in a particular instruction segment. The referenced_ptr is initialized to the first referenced segment offset address in this same instruction segment. This referenced address is to be stored in relocation reference addresses which can be located anywhere in the object code module. The edit delta data table corresponding to the instruction segment is traversed and a running total of edit change values up to each edit delta data table entry segment offset address is stored in delta_total. The relocation reference and referenced indexes are concurrently traversed and the relocation reference and referenced segment offset addresses that occur previous to the current edit delta data table entry are adjusted by this delta_total. After edit delta table traversal has been completed, all relocation reference and referenced segment offset addresses that occur between the last edit delta data table entry and the end of segment are adjusted by the final delta_total value.

After symbol and relocation data has been adjusted according to the edit delta data, further adjustments may be required if machine instruction procedure ranges are moved or deleted from an instruction segment. These additional adjustments are required for symbols and relocation data corresponding to moved procedure ranges and also for procedure ranges that follow the moved or deleted procedure ranges in the originating instruction segment.

The FIG. 30 structure is used to build segment lists which contain segment information for each object code module.

The segment_number field contains the number of the segment as it is defined in the object code module. The segment_node_ptr field is assigned the address of the segment_node that contains segment's name, class, and type information. The procedure_list field is assigned the address of the first procedure range in the segment, if the segment is an instruction segment.

The FIG. 31 source code illustrates the method of adjusting public symbol data in order to correspond to procedure ranges that are to be deleted or transferred from one instruction segment to another.

In the above source code listing, the public_ptr variable is assigned to the first public symbol within an instruction segment. All of the procedure ranges within the instruction segment are traversed and if the procedure range is to be moved or deleted then the size of that range is added to the removed_procedure_size variable. The procedure range is removed from the old segment. If this procedure range is not to be deleted then it is added to the destination segment's procedure range list and corresponding destination segment number and offset change value are assigned. If the procedure range is not to be deleted or moved, then offset change variable is set to the negative total of all previous removed procedure range sizes. All public symbols that contain addresses within the current procedure range are then adjusted corresponding to the previous procedure range departures within the instruction segment and the transfer status of the current procedure range.

Figure 13:
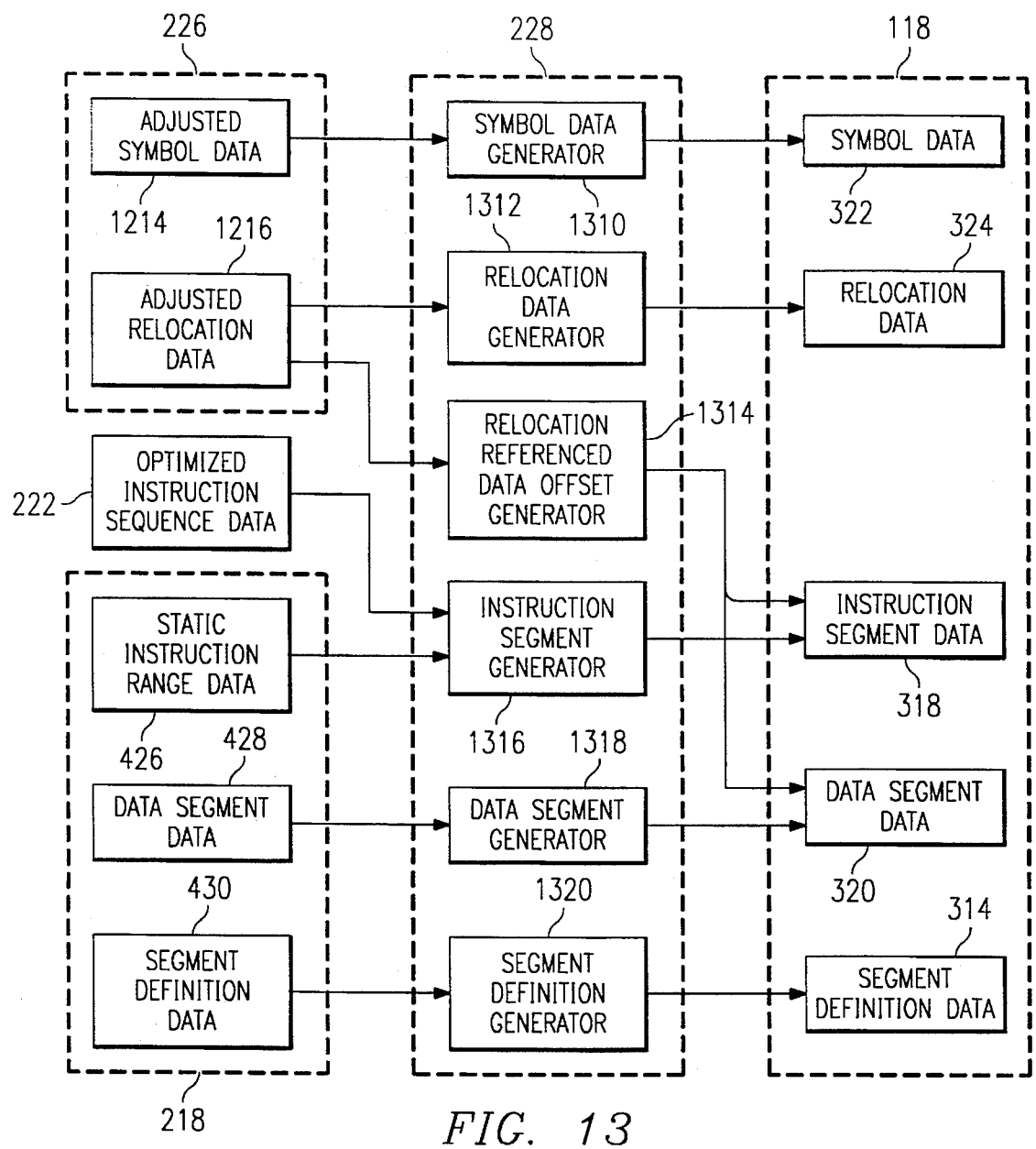
FIG. 13 shows the components of the symbol and relocation data adjuster shown in FIG. 2.

After all symbol and relocation data has been adjusted, the object code data generator (228) converts the optimized instruction sequence data (222), the corresponding adjusted symbol and relocation data (226), and the static data (218) into optimized object code data (118) (step 1440). This object code generator is shown in FIG. 13. The object code data generation process is similar to that which is performed by any compiler or assembler. The symbol data generator (1310) produces the output symbol data (322) from the adjusted symbol data (1214). The relocation data generator (1312) produces the output relocation data (324) from the adjusted relocation data (1216). The instruction segment generator (1316) combines the optimized instruction sequence data (222) and the static instruction range data (426) into the output instruction range data (318). The data segment generator (1318) produces the output data segment data (320) from the data segment data (428) stored in the static data area (218). The relocation referenced data offset generator (1314) inserts the adjusted relocation referenced offset values into their relocation reference locations within the output instruction segment contents (318) and the output data segment contents (320). The segment definition generator (1320) produces the output segment definition data (314) from the segment definition data (430) stored in the static data area (218).

This optimized object code data is output into a form suitable for input into a linker in order to produce the optimized executable program data (122).

Accordingly, the reader will see that the class of optimizations enabled by this invention are significant additions to the standard optimizations that can be performed by compilers and assemblers. In addition, the methods for identifying and isolating static instruction ranges and the methods for identifying indirect transfer of control destination ranges allow for the sufficient formulation of control flow information in order to enable the invention to operate effectively with the level of accuracy required to retain output code integrity. The identification of external process transfer of control destination ranges allow for the invention to be utilized on object code data generated for multiple process operating system environments.

Although the previous specification describes several specific types of optimizations this invention enables, these types should not be construed as the limiting scope of additionally possible optimizations. These descriptions serve merely to illustrate some of the optimizations implemented in the presently preferred embodiments of the invention. Additional optimizations, for example, could include function inlining, register reload suppression across function calls, stack frame management consolidation, etc.

Although certain figures and source code listings in this application use the Intel 80×86 instruction set in order to describe aspects of the invention, the invention should not be construed as limited to solely operating on this processor instruction set. The methods listed in this application will operate effectively on most current general purpose processor instruction sets.

What is claimed is:

1. A system for generating data representing an optimized object code set for a data processing system from data representing a complete object code set, comprising:

(a) a memory area for storing data;

(b) means for forming a plurality of data storage areas within said memory area;

(c) first converter means for converting said data representing the complete object code set into data representing a first plurality of instruction sequences to be stored in a first data storage area, a first plurality of symbol and relocation data to be stored in a second data storage area and a plurality of static data to be stored in a third data storage area;

(d) second converter means coupled with the first and second data storage areas for converting said data representing said first plurality of instruction sequences into data representing a plurality of optimized instruction sequences to be stored in a fourth data storage area;

(e) adjuster means coupled with the second storage area for adjusting said first symbol and relocation data into a plurality of adjusted symbol and relocation data to be stored in a fifth data storage area such that said adjusted symbol and relocation data corresponds to said data representing the plurality of optimized instruction sequences; and (f) data generating means coupled to said third, fourth and fifth storage areas for generating said data representing the optimized object code set from said static data, said data representing the plurality of optimized instruction sequences and said plurality of adjusted symbol and relocation data.

2. The system of claim 1 wherein said data representing the complete object code set includes a plurality of static instruction ranges.

3. The system of claim 2 wherein said data representing the complete object code set includes a plurality of statically referenced procedure ranges such that said plurality of statically referenced procedure ranges correspond to said static instruction ranges comprising:

first identifying means for designating said plurality of statically referenced procedure ranges thereby allowing for the formulation of accurate control flow information corresponding to said data representing the complete object code set.

4. The system of claim 2 wherein said static instruction ranges are indicated in a separate storage area.

5. The system of claim 4 wherein said static instruction ranges are indicated as encompassing an object code module.

6. The system of claim 4 wherein said static instruction ranges are indicated as encompassing an object code library.

7. The system of claim 2 wherein said static instruction ranges are indicated within said data representing the complete object code set.

8. The system of claim 7 wherein said static instruction ranges are indicated as encompassing a instruction segment offset begin and end address boundary.

9. The system of claim i wherein said data representing the first plurality of instruction sequences contains data representing a plurality of indirect transfer of control instructions.

10. The system of claim 9 wherein said data representing the complete object code set includes a plurality of indirect transfer of control destination procedure ranges such that said plurality of indirect transfer of control destination procedure ranges correspond to said data representing the plurality of indirect transfer of control instructions comprising:

second identifying means for designating said plurality of indirect transfer of control destination procedure ranges corresponding to said data representing the plurality of indirect transfer of control instructions thereby allowing for the formulation of accurate control flow information corresponding to said data representing the complete object code set.

11. The system of claim i wherein said complete object code data set contains a plurality of external process transfer of control destination ranges comprising:

third identifying means for designating said external process transfer of control destination ranges within said complete object code data set thereby allowing for the formulation of accurate control flow information corresponding to said data representing the complete object code set.

12. The system of claim i wherein said data representing the first plurality of instruction sequences contains data representing a plurality of limited displacement instructions.

13. The system of claim 12 wherein said data representing the plurality of limited displacement instructions contains a plurality of adjusted displacement range boundary violations comprising:

substitution means for converting selected data within said data representing the plurality of limited displacement instructions whereby said selected data contains said plurality of adjusted displacement range boundary violations into data representing a plurality of logically equivalent instruction sequences such that said logically equivalent instruction sequences include sufficiently sized adjusted displacement ranges.

14. A method for generating data representing an optimized object code set for a data processing system from data representing a complete object code set, comprising the steps of:

(a) forming a plurality of data storage areas within a memory area;

(b) converting said data representing the complete object code set into data representing a first plurality of instruction sequences to be stored in a first data storage area, a first plurality of symbol and relocation data to be stored in a second data storage area and a plurality of static data to be stored in a third data storage area;

(c) converting said data representing said first plurality of instruction sequences into data representing a plurality of optimized instruction sequences to be stored in a fourth data storage area;

(d) adjusting said first symbol and relocation data into a plurality of adjusted symbol and relocation data to be stored in a fifth data storage area such that said adjusted symbol and relocation data corresponds to said data representing the plurality of optimized instruction sequences; and (e) generating said data representing the optimized object code set from said static data, said data representing the plurality of optimized instruction sequences and said plurality of adjusted symbol and relocation data.

15. The method of claim 14 wherein said data representing the complete object code set includes a plurality of static instruction ranges.

16. The method of claim 15 wherein said data representing the complete object code set includes a plurality of statically referenced procedure ranges such that said plurality of statically referenced procedure ranges correspond to said static instruction ranges further comprising the steps of:

designating said plurality of statically referenced procedure ranges thereby allowing for the formulation of accurate control flow information corresponding to said data representing the complete object code set.

17. The method of claim 15 wherein said static instruction ranges are indicated in a separate storage area.

18. The method of claim 17 wherein said static instruction ranges are indicated as encompassing an object code module.

19. The method of claim 17 wherein said static instruction ranges are indicated as encompassing an object code library.

20. The method of claim 15 wherein said static instruction ranges are indicated within said data representing the complete object code set.

21. The method of claim 20 wherein said static instruction ranges are indicated as encompassing a instruction segment offset begin and end address boundary.

22. The method of claim 14 wherein said data representing the first plurality of instruction sequences contains data representing a plurality of indirect transfer of control instructions.

23. The method of claim 22 wherein said data representing the complete object code set includes a plurality of indirect transfer of control destination procedure ranges such that said plurality of indirect transfer of control destination procedure ranges correspond to said data representing the plurality of indirect transfer of control instructions further comprising the steps of:

designating said plurality of indirect transfer of control destination procedure ranges corresponding to said data representing the plurality of indirect transfer of control instructions thereby allowing for the formulation of accurate control flow information corresponding to said data representing the complete object code set.

24. The method of claim 14 wherein said complete object code data set contains a plurality of external process transfer of control destination ranges further comprising the steps of:

designating said external process transfer of control destination ranges within said complete object code data set thereby allowing for the formulation of accurate control flow information corresponding to said data representing the complete object code set.

25. The method of claim 14 wherein said data representing the first plurality of instruction sequences contains data representing a plurality of limited displacement instructions.

26. The method of claim 25 wherein said data representing the plurality of limited displacement instructions contains a plurality of adjusted displacement range boundary violations further comprising the steps of:

converting selected data within said data representing the plurality of limited displacement instructions whereby said selected data contains said plurality of adjusted displacement range boundary violations into data representing a plurality of logically equivalent instruction sequences such that said logically equivalent instruction sequences include sufficiently sized adjusted displacement ranges.

* * * * *

UNITED STATES PATENT AND TRADEMARK OFFICE
CERTIFICATE OF CORRECTION

PATENT NO. : 5,469,572
DATED : November 21, 1995
INVENTOR(S) : James M. Taylor

It is certified that error appears in the above-indentified patent and that said Letters Patent is hereby corrected as shown below:

Col. 16, line 53, in claim 9, please amend "i" to -- 1 --.

Col. 17, line 4, in claim 11, please amend "i" to -- 1 --.

Col. 17, line 13, in claim 12, please amend "i" to -- 1 --.

Signed and Sealed this

Sixth Day of February, 1996

Attest:

BRUCE LEHMAN

*Attesting Officer*    *Commissioner of Patents and Trademarks*

(12) EX PARTE REEXAMINATION CERTIFICATE (6657th)
United States Patent
Taylor

(10) Number: US 5,469,572 C1
(45) Certificate Issued: Feb. 17, 2009

(54) POST COMPILE OPTIMIZER FOR LINKABLE OBJECT CODE

(75) Inventor: James M. Taylor, Dallas, TX (US)

(73) Assignee: Interproc Technologies L.L.C., Carrollton, TX (US)

Reexamination Request:
No. 90/010,019, Aug. 31, 2007

Reexamination Certificate for:
Patent No.: 5,469,572
Issued: Nov. 21, 1995
Appl. No.: 07/984,082
Filed: Dec. 1, 1992

Certificate of Correction issued Feb. 6, 1996.

(51) Int. Cl.
*G06F 9/45* (2006.01)
*G06F 9/445* (2006.01)

(52) U.S. Cl. ....................................................... 717/152
(58) Field of Classification Search ........................ None
See application file for complete search history.

(56) References Cited

U.S. PATENT DOCUMENTS 5,313,614 A    5/1994    Goettelmann et al.
5,335,344 A    8/1994    Hastings

FOREIGN PATENT DOCUMENTS

WO    WO 90001738    2/1990

OTHER PUBLICATIONS

David Wall, Post–Compiler Code Transformation, tutorial at SIGPLAN '92 Conference on Programming Language Design and Implementation, Jun. 1992, 69 pages.
Wall, David W., "*Experience with a Software Defined Machine Architecture*," WRL–Research Report 91/10, Digital Equipment Corporation, published Aug. 1991.
Wall, David W., "*Link Time Code Modification*," WRL–Research Report 89/17, Digital Equipment Corporation, published Jun. 1989.
Wall, David. W., "*Systems for Late Code Modification*," WRL–Technical Note TN–19, Digital Equipment Corporation, published Jun. 1991.
Banning, J., "*The XDOS Binary Code Conversion System*," published 1989, by the IEEE.

*Primary Examiner*—Colin M LaRose

(57) ABSTRACT

A system for processing a complete object code data set, to be linked into an executable program. The system features means for facilitating optimization analysis based upon the complete object code data set and also means for modifying the object code data based upon the optimization analysis results. The system allows for the specification of static instruction ranges that are to be isolated from the optimization process. Indirect and external process transfer of control destination ranges are identified in order to formulate the proper control flow information necessary to retain the optimized object code data integrity. The system enables the implementation of a class of optimizations which are supplemental to the standard class of optimizations performed during the initial object code generation process.

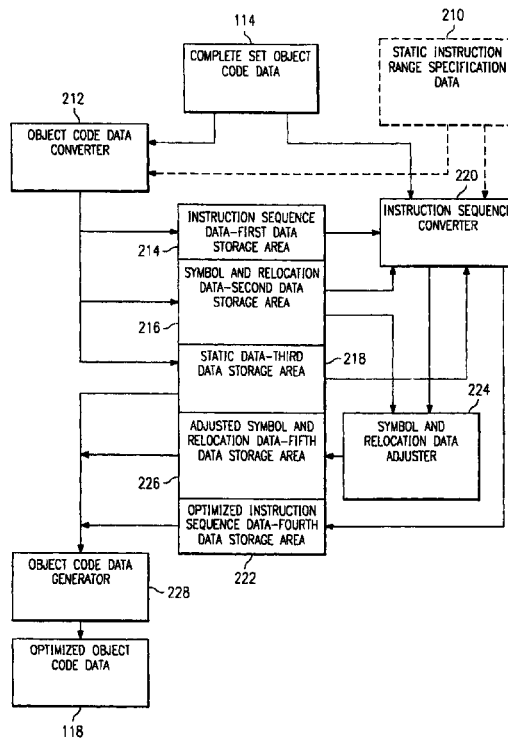

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–26 is confirmed.

* * * * *